(12) United States Patent
Suzuki et al.

(10) Patent No.: US 6,871,158 B2
(45) Date of Patent: Mar. 22, 2005

(54) APPARATUS FOR MEASURING SHAPE OF LENS-FRAMES

(75) Inventors: Yasuo Suzuki, Tokyo (JP); Yoshimasa Ogawa, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 20 days.

(21) Appl. No.: 10/308,826

(22) Filed: Dec. 3, 2002

(65) Prior Publication Data

US 2003/0105612 A1 Jun. 5, 2003

(30) Foreign Application Priority Data

Dec. 3, 2001  (JP) ........................................ 2001-368631

(51) Int. Cl.[7] .......................... G01B 15/00; G01B 7/00; G06F 15/00
(52) U.S. Cl. ..................................................... 702/155
(58) Field of Search .............................. 702/155; 451/8, 451/42, 44; 73/104; 33/507, 200

(56) References Cited

U.S. PATENT DOCUMENTS

| | | | |
|---|---|---|---|
| 5,515,612 A | 5/1996 | Igarashi et al. | |
| 5,959,199 A | * 9/1999 | Suzuki et al. | 73/104 |
| 6,006,592 A | 12/1999 | Suzuki et al. | |
| 6,325,700 B1 | * 12/2001 | Mizuno et al. | 451/8 |
| 6,409,574 B1 | * 6/2002 | Shibata | 451/5 |
| 6,530,156 B1 | * 3/2003 | Matsuyama | 33/507 |
| 6,592,431 B2 | * 7/2003 | Mizuno et al. | 451/9 |

FOREIGN PATENT DOCUMENTS

| | | | |
|---|---|---|---|
| EP | 0 606 171 A1 | 7/1994 | ............. B24B/9/14 |
| JP | 6-55126 | 7/1994 | ............. G02C/13/00 |
| JP | 2002-036084 | 2/2002 | ............. B24B/9/14 |
| JP | 2002-098518 | 4/2002 | ............. G01B/21/20 |

* cited by examiner

*Primary Examiner*—John Barlow
*Assistant Examiner*—Aditya Bhat
(74) *Attorney, Agent, or Firm*—Chapman and Cutler LLP

(57) ABSTRACT

An apparatus for measuring a shape of lens frames capable of measuring precisely the shape of lens frames by changing a rotational speed or rotational direction of a measuring element (feeler) 216 in accordance with the shape of lens frames. The measuring element 216 contacts with V-shaped grooves (grooves for lens frames) 51 provided in lens frames LF and RF of an eyeglass frame MF. An arithmetic control circuit 270 controls variably the rotational speed or rotational direction of the measuring element 216.

18 Claims, 17 Drawing Sheets

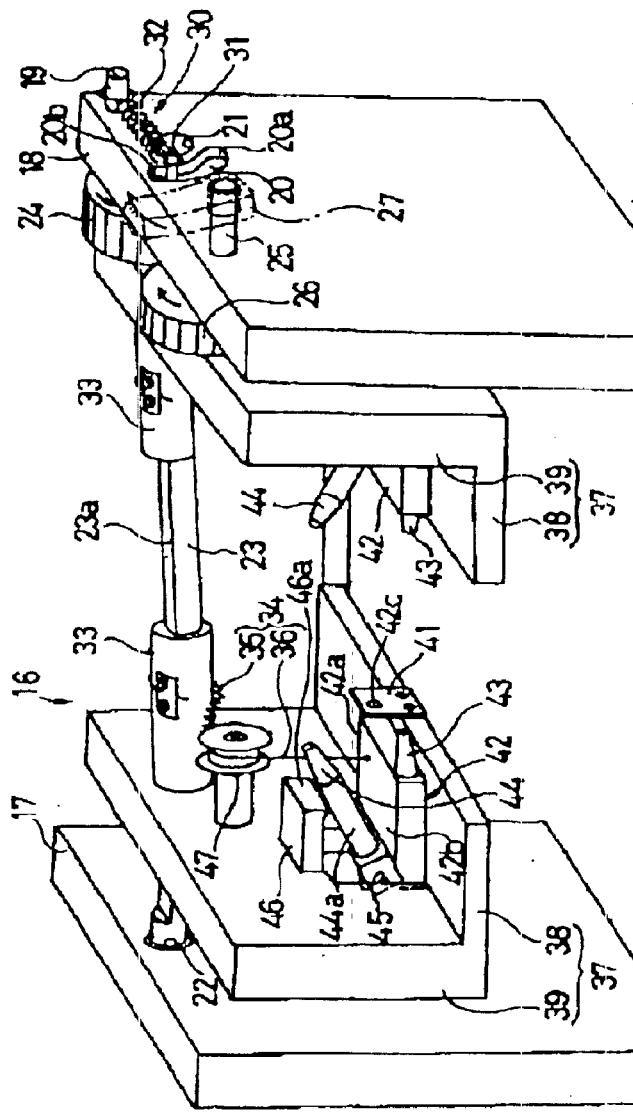
Fig. 5(a)
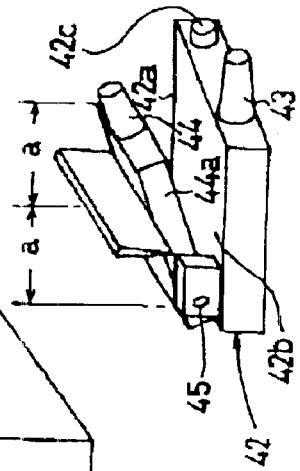
Fig. 5(d)
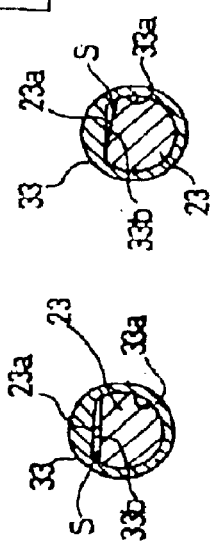
Fig. 5(b)
Fig. 5(c)

Fig. 10(a)
Fig. 10(b)
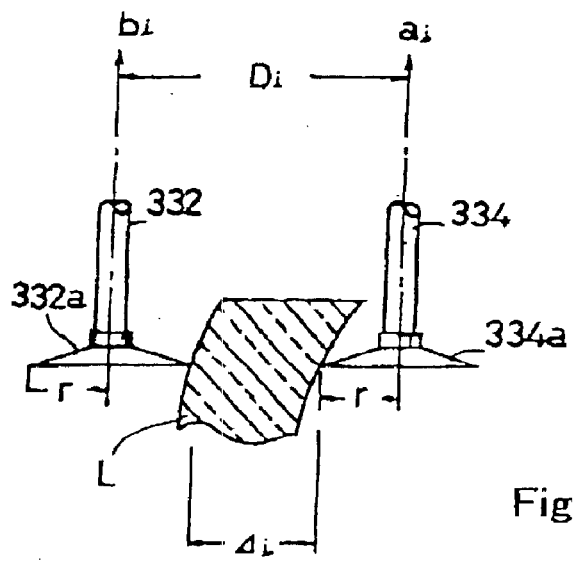
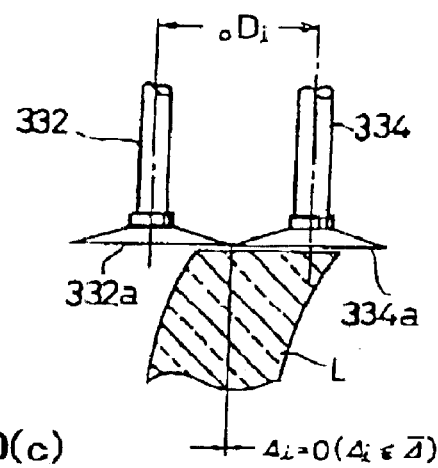
Fig. 10(c)
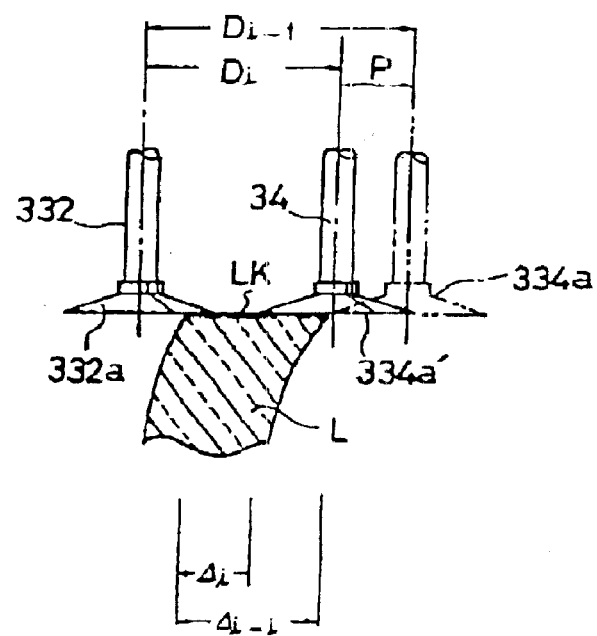

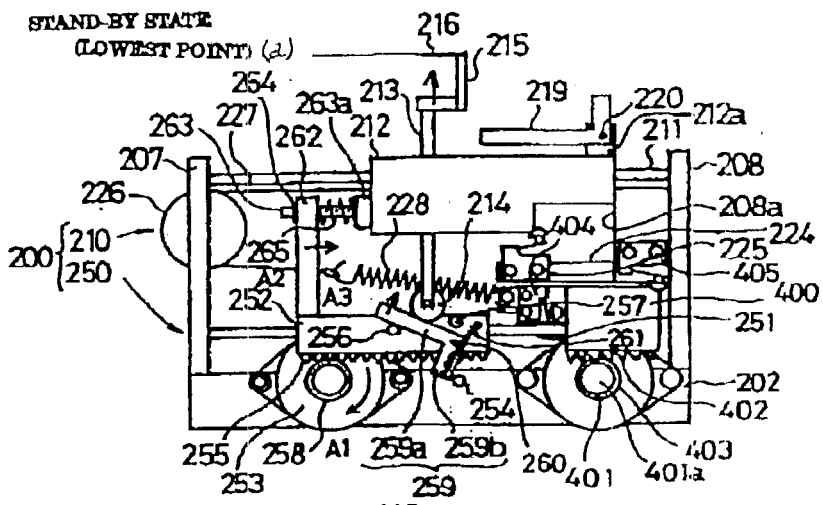
Fig. 11(a)
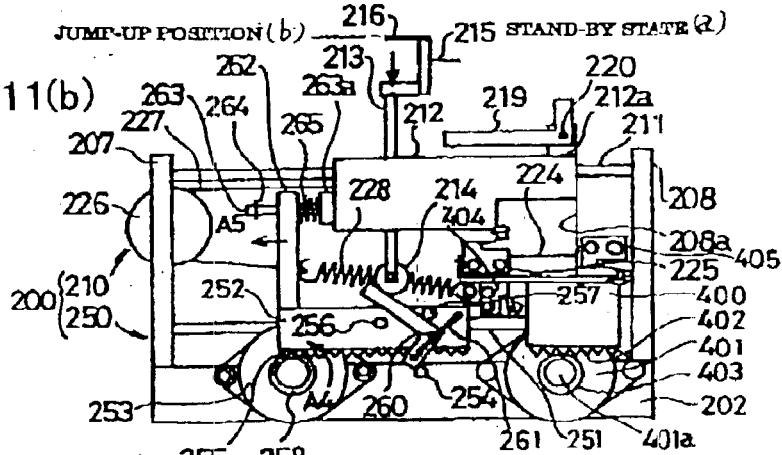
Fig. 11(b)
Fig. 11(c)

APPARATUS FOR MEASURING SHAPE OF LENS-FRAMES

BACKGROUND OF THE INVENTION

1. Field of the Invention

The present invention relates to an apparatus for measuring a shape of lens frames in eyeglasses by means of a measuring element.

2. Description of the Prior Art

Conventionally, there is developed an apparatus for measuring a shape of lens frames in eyeglasses by contacting a measuring element with grooves of the lens frames.

On the other hand, there may be lens frames which are easily deformable by an external force since a rim of the frames is narrow in width in a direction perpendicular to an optical axis of lenses of eyeglasses which are inserted into the frames.

There are also so-called crab-eye shaped lens frames (hereinafter referred to as elongate lens frames) of eyeglasses whose longitudinal distance is smaller than lateral distance, viewing from the front of the eyeglasses. Such lens frames have a rim whose width is narrow, to easily deform by operation of an external force, as mentioned above.

There is a problem that a nose pads or ear hooks of deformable lens frames, for example, the aforementioned elongate lens frames are subjected to deform and therefore a shape of the elongate frames can not be precisely measured, when the elongate lens frames are measured by the frame shape measuring apparatus, if the rotational speed or rotational direction of the aforementioned measuring element is substantially constant.

SUMMARY OF THE INVENTION

It is therefore an object of the present invention, to provide an apparatus for measuring a shape of lens frames capable of measuring precisely the shape by changing a rotational speed or rotational direction of a measuring element in accordance with the shape of lens frames.

To achieve the above object, an apparatus for measuring a shape of lens frames of eyeglasses according to the present invention comprises: a measuring element for contacting with grooves of said lens frames; and control means for controlling variably a rotational speed or rotational direction of the measuring element.

The control means controls the rotational speed of the measuring element to rotate it while contacting the measuring element with the grooves of the lens frames at an indicated interval of time with manual or automatic.

The control means also controls the rotational speed of the measuring element to rotate it while contacting the measuring element with the grooves of the lens frames at an interval of time of a set switch pressed with manual.

The control means also includes means for judging whether or not lens frames are to be measured.

The control means further includes means for warning said judgment to an operator.

The apparatus according to the present invention further comprises means for setting a measured part of the measuring element.

The apparatus also comprises means for measuring a time of contact of said measuring element with said lens frames.

The apparatus further comprises means for varying a contacting force of the measuring element with the lens frames.

BRIEF DESCRIPTION OF THE DRAWINGS

FIG. 5($a$) is a perspective view of a main portion of the frame shape measuring apparatus shown in FIGS. 2($a$) and 4, and FIGS. 5($b$) and ($c$) are sectional views showing a relationship between a cylindrical shaft and an operating shaft in the apparatus as shown in FIG. 5($a$) and FIG. 5($d$) is an explanatory view of holding claws.

FIGS. 10($a$) to 10($c$) are explanatory views showing an operation of feelers shown in FIG. 9.

FIGS. 11($a$) to 11($c$) are explanatory views showing an operation of the measuring portion of the lens shape measuring apparatus.

DETAILED DESCRIPTION OF THE PREFERRED EMBODIMENTS

Figure 1:
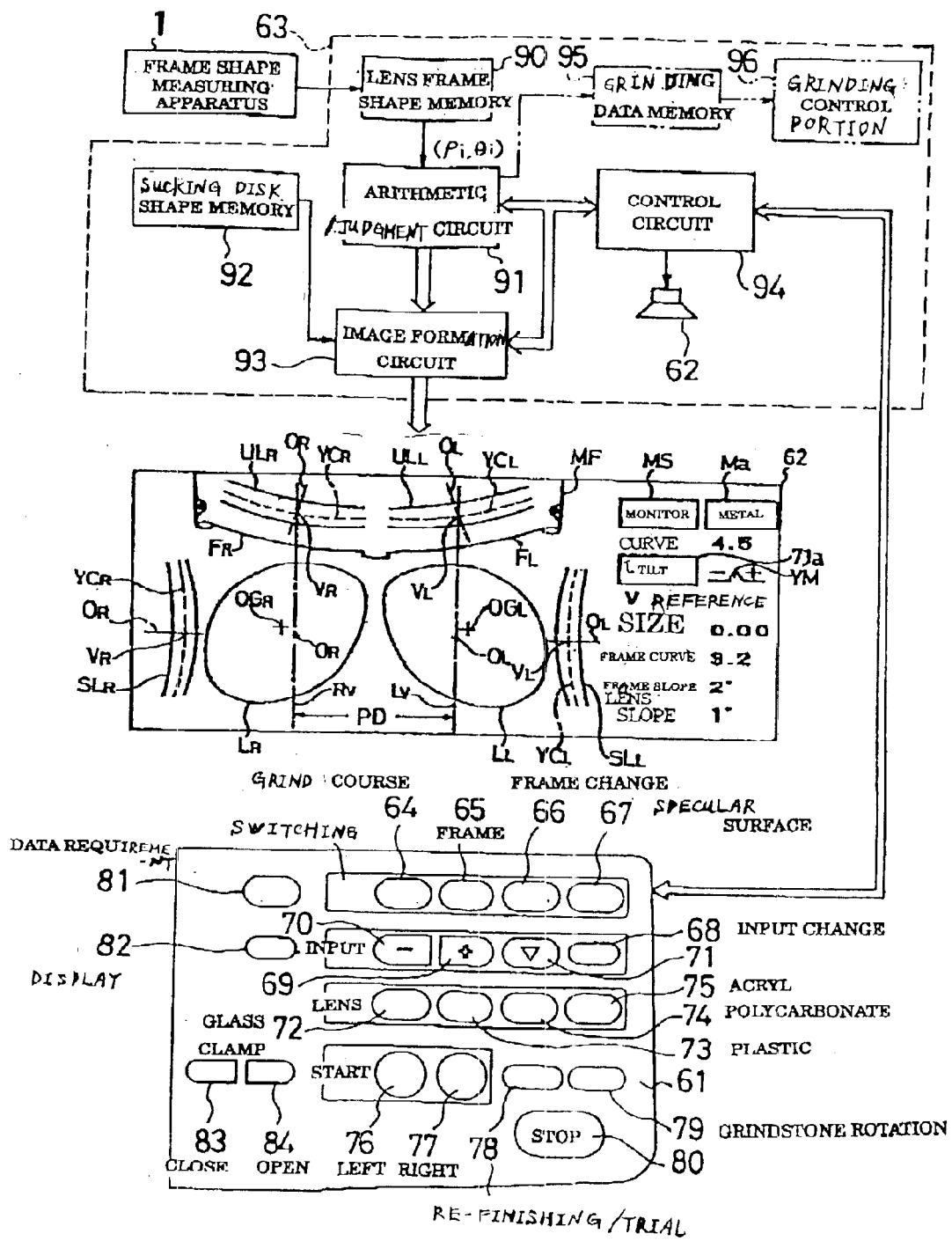
FIG. 1 is a view showing a control circuit of an apparatus of determining whether or not an eyeglass lens is suitable.

Embodiments of an apparatus for measuring a shape of lens frames according to the present invention will be described with reference to the attached drawings below.

In FIG. 2, reference numeral 1 denotes a frame shape measuring apparatus and reference 2 denotes a grinding apparatus (lens edging apparatus) for grinding and shaping an uncut lens into a finished eyeglass lens, based on shape data for eyeglass obtained from the apparatus 1.

(1) Frame Shape Measuring Apparatus 1

Figure 4:
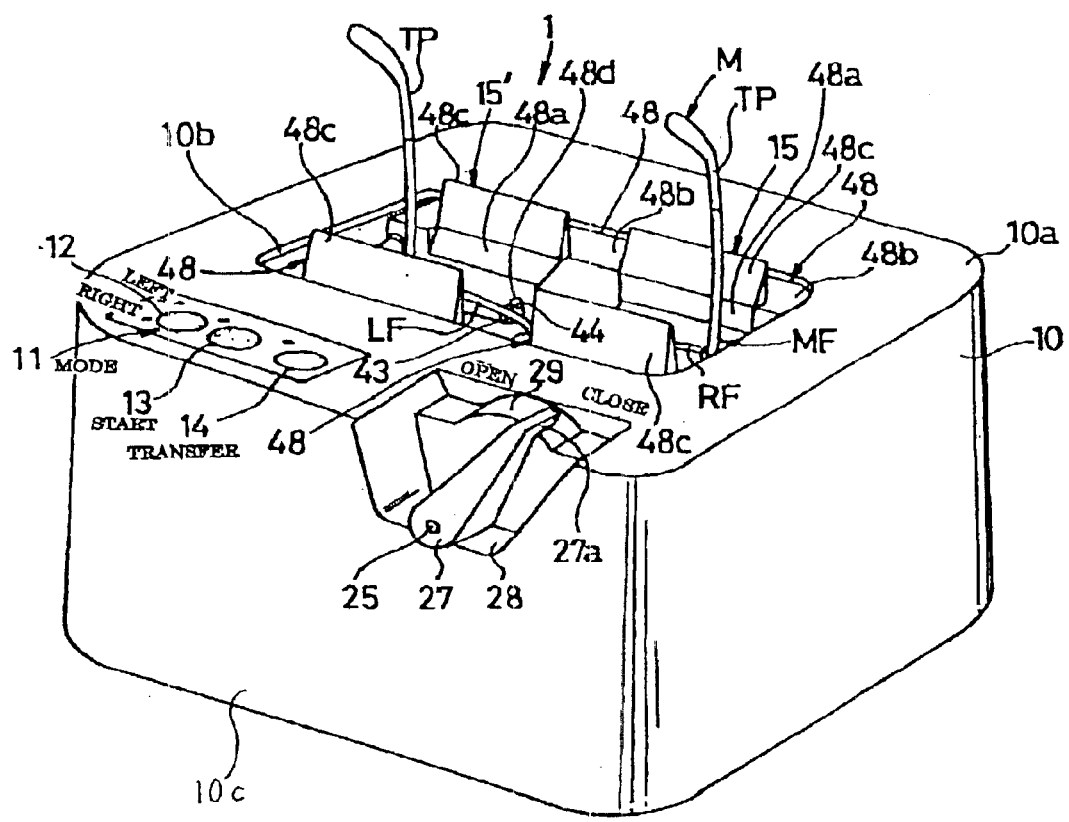
FIG. 4 is an enlarged perspective view of the frame shape measuring apparatus shown in FIG. 2($a$).

As shown in FIG. 4, the frame shape measuring apparatus 1 comprises an apparatus body 10 having an opening 10b in the middle of an upper surface 10a and a switch portion (operation panel) 11 mounted on the upper surface 10a of the body 10. The switch portion 11 includes a mode changing switch 12 for changing over right and left measurement modes, a start switch 13 for starting a measurement and a transfer switch 14 for transferring data.

A light emitting diode LED1 indicating that a lens frame to be measured is left and a light emitting diode LED 2 indicating that a lens frame to be measured is right are disposed on the left side of the mode changing switch 12. Light emitting diodes LED3 and LED4 are disposed on upper portions of the start switch 13 and transfer switch 14, respectively.

Figure 7A:
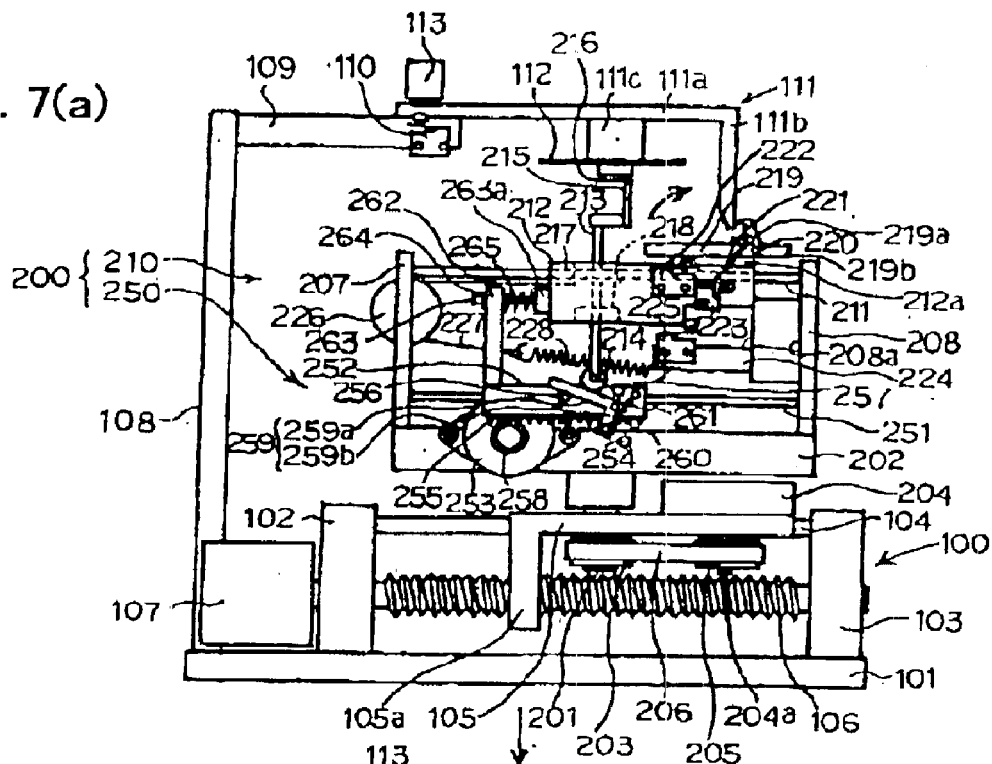
FIGS. 7($a$) and 7($b$) are explanatory views of a frame shape measuring part, etc. of the frame measuring apparatus.
Figure 7B:
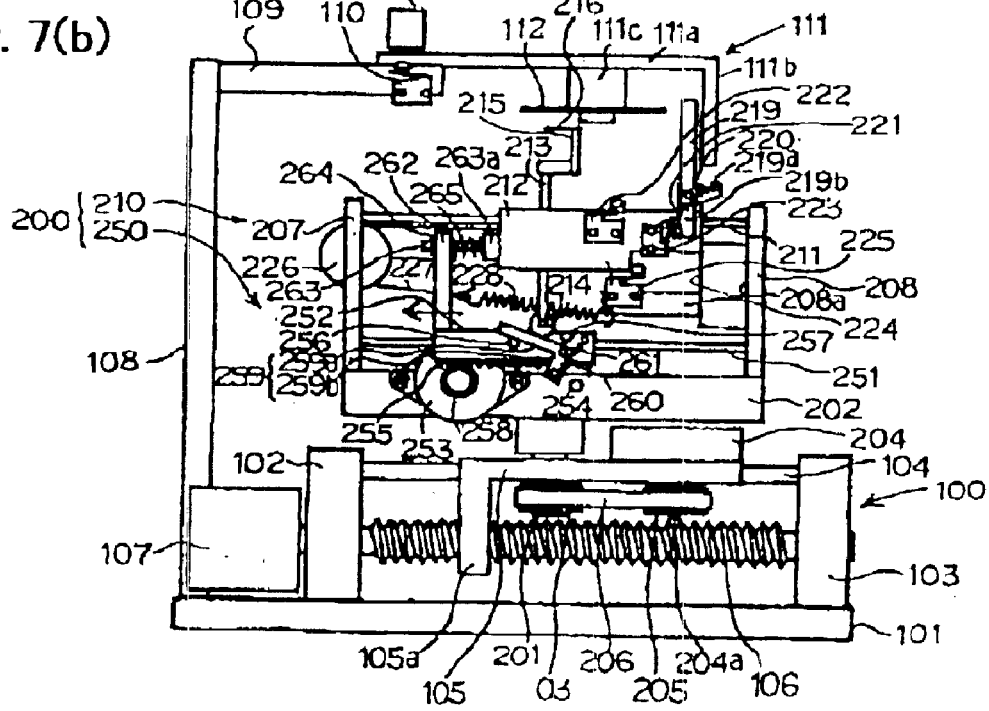

The frame shape measuring apparatus 1 further comprises eyeglass frame holding mechanisms (lens frame holding means) 15, 15' for holding right and left lens frames LF, RF of an eyeglass frame MF of eyeglasses M as shown in FIG. 4, an operation mechanism 16 (see FIG. 5(a)), a measurement portion moving mechanism 100 as shown in FIGS. 7(a), 7(b), and a frame shape measurement portion (frame shape measuring means) 200 supported by the mechanism 100. These measurement portion moving mechanism 100 and the frame shape measurement portion 200 constitute a measuring element moving mechanism (feeler moving mechanism).

The measurement portion moving mechanism 100 moves the frame shape measurement portion 200 between the eyeglass frame holding mechanisms 15 and 15'. The frame shape measurement portion 200 measures the shape of the eyeglass frame MF, in more detail, measures the shape of the lens frame LF (RF) thereof. These mechanisms 15, 15', 16, 100 and the measurement portion 200 are mounted within the apparatus body 10.

In FIGS. 7(a) and 7(b), reference numeral 101 denotes a chassis as a fixed base disposed on a lower part of the body 10. In FIG. 5(a), reference numerals 17 and 18 denote supporters (not shown in the chassis 101) mounted in parallel to each other and fixed upward and downward, reference numeral 19 denotes an engagement pin projecting from an outside surface (opposite to the supporter 17) of the supporter 18, reference numeral 20 denotes a circular slit mounted on an upper end portion of the supporter 18, reference numerals 21 and 22 denote mounting holes formed in the supporters 17 and 18, respectively. The mounting hole 22 is formed between the circular slit 20 and the engagement pin 19. The circular slit 20 is concentric with the mounting hole 22.

(Operation Mechanism 16)

The operation mechanism 16 comprises an operation shaft 23 rotatably held in the mounting holes 21, 22 of the supporters 17 and 18, a driven gear 24 fixed to an end portion of the operation shaft 23 on the side of the supporter 18, a rotation shaft 25 passing through the supporter 18 and a front surface 10c of the body 10, a driving gear 26 fixed to an end portion of the rotation shaft 25 (or formed integrally with the rotation shaft 25) and engaged with the driving gear 24, and an operation lever 27 mounted on the other end portion of the rotation shaft 25. Reference numeral 23a denotes a flat portion formed on the operation shaft 23 and extending close to the two end portions of the operation shaft 23.

In the apparatus body 10, a concave portion 28 is formed extending from the front surface 10c to the upper surface 10a, and a circular projection 29 is formed on the concave portion 28. Signs "ON" and "OFF" are provided on the upper surface 10a and are positioned on right and left sides of the projection 29, respectively. The lever 27 is disposed on a front surface of the concave portion 28, and a curved portion, namely, instruction portion 27a is mounted on an upper portion of the lever 27 and is movable on the projection 29.

Between the driving gear 24 and the engagement pin 19, a two-position holding mechanism (two-position holding means) 30 is mounted for holding the frame (corresponding to the sign "ON") and releasing the frame from being held (corresponding to the sign "OFF").

The two-position holding mechanism 30 comprises the circular slit 20, a movable pin 31 projecting from a side surface of the driving gear 24 and passing through the circular slit 20, and a spring 32 (tension coil spring) arranged between the movable pin 31 and the engagement pin 19. Since the circular slit 20 is concentric with the mounting hole 22 as mentioned above, the driving gear 24 and the operation shaft 23 are also concentric with each other. For this reason, the movable pin 31 is held by one of two end portions 20a and 20b of the circular slit 20 by the spring 32.

The operation mechanism 16 further comprises a pair of barrel shafts 33, 33 held such that the pair of barrel shafts 33, 33 are movable in a longitudinal direction of the operation shaft 23 and are slightly rotatable relatively in a circumferential direction. Between a flat portion 33b of a cut-circular through-hole 33a of the barrel shaft 33 and the flat portion 23a of the operation shaft 23, a slight space S is formed as shown in FIGS. 5(b) and 5(c). In the barrel shafts 33, 33, string-like bodies 34 (only one is shown in FIG. 5(a)) are mounted each of which includes a portion which is elastic because of its own elastic force. The string-like body 34 comprises a spring (elastic portion) 35 an end of which is fixed to the barrel shaft 33 and a wire 36 connected to the other end of the spring 35.

(Frame Holding Mechanisms 15, 15')

The frame holding mechanisms 15, 15' are same in structure, and therefore only the frame holding mechanism 15 will be described.

The frame holding mechanism 15 comprises a pair of movable supporter 37, 37 as sliders held in the body 10 which are movable in a horizontal direction and are movable close to (or away from) each other. Each of the movable supporters 37, 37 is shaped like "L" which consists of a horizontal plate portion 38 and a vertical plate portion 39 which vertically extends from an end of the horizontal plate portion 38. In the vertical plate portion 39, the barrel shaft 33 is held rotatably but cannot be moved in an axis direction.

The frame holding mechanism 15 further comprises a tension coil spring 40 which is arranged between the horizontal plate portions 38, 38 of the movable supporters 37, 37 as shown in FIG. 6, a supporting plate 41 fixed in the center of a front end of the horizontal plate portion 38, and a claw mounting plate 42 disposed between the vertical plate portion 39 and a part of the supporting plate 41 which projects from the horizontal plate portion 38 upward. The claw mounting plate 42 is held rotatably centering a shaft-shaped supporting projection 42c of a side portion 42a by both the supporting plate 41 and the vertical plate portion 39. Another shaft-shaped supporting projection of a rear side portion of the claw mounting plate 42 is not shown.

A tapered holding-claw 43 projects from a front end of the other side portion 42b of the claw mounting plate 42. A rear end portion of a shaft-shaped holding claw 44 is held rotatably on a rear end of the other side portion of the claw mounting plate 42, by a supporting shaft 45.

The supporting claw 44, of which a base is shaped like a square plate as shown in FIG. 5(d) and the front end portion is tapered, is rotatable on the supporting shaft 45 and is allowed to relatively approach the supporting claw 43 or recede therefrom. Additionally, the front end portion of the supporting claw 44 and the claw mounting plate 42 are urged to be opened by a torsion spring (not shown) wound on the supporting shaft 45.

In the vertical plate portion 39, an "L"-shaped engagement claw 46 is projected therefrom and is positioned above the holding claw 44. An edge-shaped claw 46(a) of a front end portion of the engagement claw 46 which extends downward is engaged with the supporting claw 44. Thus, when the other side portion 42b of the claw supporting plate 42 is rotated upward centering the side portion 42a, a space between the supporting claws 43 and 44 is narrowed by the torsion spring (not shown). As shown in FIG. 5(d), the edge-shaped claw portion 46a of the engagement claw 46 is engaged with a middle portion of the holding claw 44. Between the engagement claw 46 and the barrel shaft 33, an idle pulley 47 is mounted which is rotatably attached to the vertical plate portion 39. The wire 36 is put on the idle pulley 47, and an end of the wire 36 is situated between the two side portions 42a and 42b and is fixed to the claw mounting plate 42.

Figure 6A:
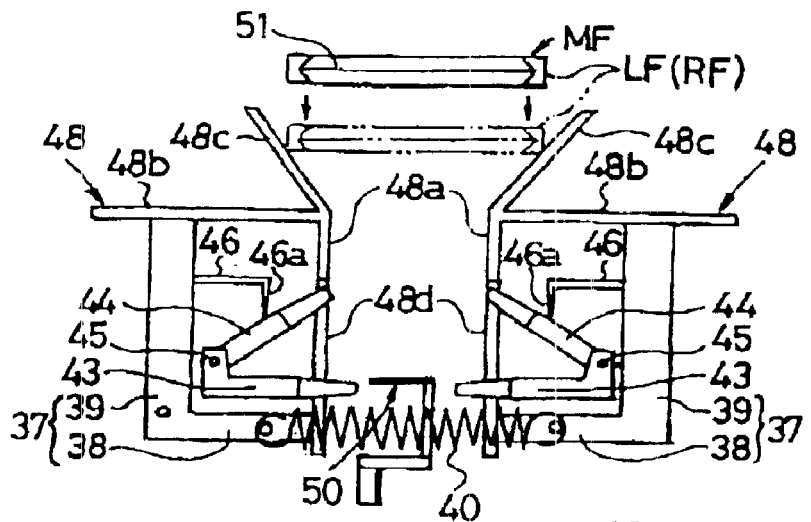
FIGS. 6($a$) to 6($c$) are views for explaining an operation for holding an eyeglass frame in the apparatus shown in FIGS. 2, 4 and 5.
Figure 6B:
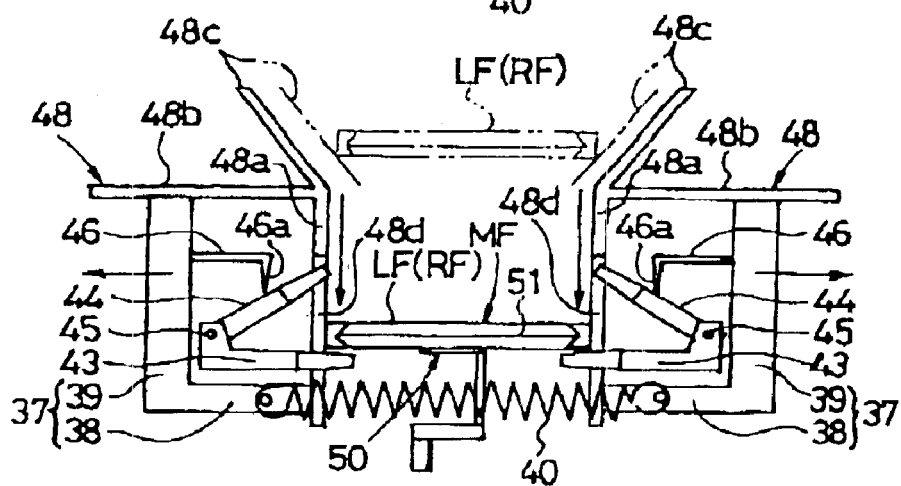

The movable supporters 37, 37 have two opposite sides which are covered with a frame guide member 48 shown in FIG. 4 and FIGS. 6(a) to 6(c). The frame guide member 48 comprises a vertical plate portion 48a fixed to a front end of the horizontal plate portion 38, a horizontal plate portion 48b fixed to an upper end of the vertical plate portion 39, and an inclined guide plate 48c connected to a corner, at which the plate portions 48a and 48b are connected to each other, and inclining to the horizontal plate portion 48b. In the vertical plate portion 48a, an aperture 48d is formed corresponding to the holding claws 43 and 44, and the holding claw 44 projects from the aperture 48d. The front end portion of the holding claw 43 is to be positioned within the aperture 48d in an open state in which the holding claws 44 and 43 are widened at its maximum, as shown in FIGS. 6(a) and 6(b).

In this construction, the inclined guide plates 48c, 48c of the frame guide members 48, 48 are inclined in a direction in which the distance between the guide plates 48c, 48c is gradually widened upward. Accordingly, when the eyeglass frame MF is placed between the inclined guide plates 48c, 48c, as shown in FIG. 6(a), and is pushed down against the force of the coil spring 40, a space between the frame guide members 48, 48 is widened by means of the inclined guide plates 48c, 48c, and the eyeglass frame MF (in more detail, the lens frame LF (RF) of the eyeglass frame MF) is moved to be engaged with the holding claws 43, 43.

Figure 6C:
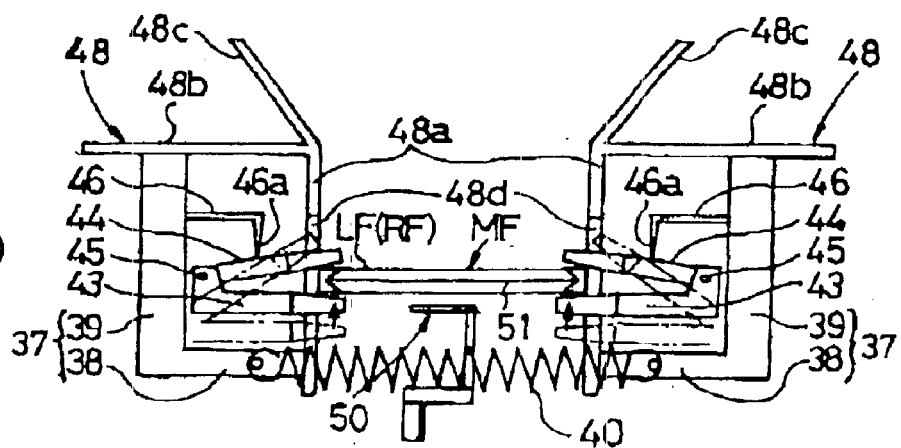

In this state, when the operation lever 27 is operated to be moved from the position "OFF" to the position "ON", this movement is transferred to the barrel shaft 33 via the rotation shaft 25, the gears 26, 24, and the operation shaft 23, and thereby part of the spring 35 is wound on the barrel shaft 33 so that via the wire 36 contacted with the spring 35, the claw mounting plate 42 is then rotated upward centering the side portion 42a, the space of the holding claws 43, 44 is then narrowed as shown in FIG. 6(c), and, as a result, the lens frame LF(RF) of the eyeglass frame MF is held between the holding claws 43, 44 as shown in FIG. 6(c). In this position, the movable pin 31 is held on the lower end 20a of the circular slit 20 by the spring 32.

In order to remove the lens frame LF (RF) of the eyeglass frame MF from the holding claws 43, 44, the operation lever 27 is operated conversely to the aforementioned operation so that the members are conversely actuated.

(Measurement Portion Moving Mechanism 100)

The measurement portion moving mechanism 100 comprises supporting plates 102, 103 which are fixed to a chassis 101 and are spaced in a direction where the frame holding mechanisms 15, 15' are arranged, and a guide rail 104 horizontally stretched between the upper parts of the supporting plates 102, 103. The guide rail 104 stretched therebetween is two in number, but the other one is not shown. The two guide rails 104 are arranged parallel with each other in a direction perpendicular to the figure (i.e., to the drawing sheet). FIGS. 7(a), 7(b) and FIGS. 8(a), 8(b) schematically show the measurement portion moving mechanism of FIG. 4.

The measurement portion moving mechanism 100 further comprises a slide base 105 which is held on the guide rails 104 and is freely movable to-and-fro in an extending direction of the guide rails 104, a feed screw 106 which is held under the guide rails 104 and is rotatable around the supporting plates 102, 103, and a measurement portion moving motor 107 which drives and rotates the feed screw 106.

The feed screw 106 is placed parallel to the guide rail 104, and the motor 107 is fixed to the chassis 101. The vertical plate portion 105a extending downward is formed integrally with the slide base 105, and the feed screw 106 is screwed to the female-screw portion (not shown) of the vertical plate portion 105a. Thus, the slide base 105 can be operated to be moved laterally in FIGS. 7(a) and 7(b) by rotating the feed screw 106.

In FIGS. 7(a) and 7(b), reference numeral 108 denotes a supporting plate which is fixed to a left end of the chassis 101 and extends up and down, reference numeral 109 denotes a holder supporting piece fixed to the left of an upper end of the supporting plate 108, and reference numeral 110 denotes a micro-switch (sensor) serving as a detection means which is mounted on a side surface of a front end portion of the holder supporting piece 109. The micro-switch 110 is used to detect a lens shape holder (lens-shaped template holding means) 111 which holds a lens-shaped template, such as that of a demonstration lens, and a frame-shaped template. The micro-switch 110 may be mounted on the supporter 17 or 18 of FIG. 5(a), and the micro-switch 110 may detect that the holding claws 43, 44 have held the lens shape holder or the lens-shaped template holder 111 by the contact with the movable supporters 37, 37 when the holding claws 43, 44 hold the lens-shaped template holder 111.

The lens-shaped template holder 111 consists of a holding plate portion 111a and a feeler erecting plate portion 111b, and is shaped like "L" in section. A holding boss portion 11c is formed integrally with the holding plate portion 111a and holds a lens-shaped template (frame-shaped template) 112.

In FIGS. 7(a) and 7(b), reference numeral 113 denotes a fixing screw attached to an end of the holding plate portion 111a. When the holding plate portion 111a is fixed to the front end of the holder supporting piece 109 by means of this screw 113, the holding plate portion 111a is brought into contact with a sensor lever 110a of the micro-switch 110, and thereby it is detected that the lens-shaped template 112 is in a measurable state.

(Frame Shape Measurement Portion 200)

The frame shape measurement portion 200 shown in FIGS. 7(a) and 7(b) comprises a rotation shaft 201 which vertically passes through the slide base 105 and is rotatably held, a rotation base 202 horizontally mounted on an upper end portion of the rotation shaft 201, a timing gear 203 fixed to a lower end portion of the rotation shaft 201, a base rotating motor (pulse motor) 204 which is fixed to the slide base 105 and is adjacent to the rotation shaft 201, a timing gear 205 which is fixed to an output shaft 204a of the base rotating motor 204, and a timing belt 206 stretched between the timing gears 203 and 205. The output shaft 204a passes through the slide base 105 and projects downward. Reference numerals 207, 208 denote supporting plates projecting from the two end portions of the rotation base 202. With the above construction, the rotation base 202 is held rotatably horizontally on the slide base 105.

The frame shape measurement portion 200 comprises a measuring portion 210 and measuring element positioning means 250.

(Measuring Portion 210)

The measuring portion 210 comprises two guide rails (only one is shown) 211 which are horizontally laid over the supporting plates 207, 208, an upper slider 212 which is held on the guide rail 211 and is freely and movable in a longitudinal direction (horizontally), a measuring shaft 213 which vertically passes through an end of the upper slider 212, a roller 214 attached to a lower end of the measuring shaft 213, an "L"-shaped member 215 mount ed on an upper end of the measuring shaft 213, and a measuring element (feeler) 216 attached to an upper end of the "L"-shaped member 215. A front end of the measuring element 216 coincides with an axis of the measuring shaft 213. The measuring shaft 213 is held in the upper slider 212 where the measuring shaft 213 can move up and down and rotate freely around the shaft line.

The measuring portion 210 further comprises a vector-radius measuring means (means for detecting a moved amount of the measuring element, means for measuring a width of the rim) 217 which measures and outputs the amount of movement (vector radius pi) along the guide rail 211 of the upper slider 212, and a measuring means 218 which measures and outputs the amount of vertical movement Zi of the measuring element 216, namely the amount of up-and-down (Z-axis direction) movement of the measuring shaft 213. Means for detecting the amount of linear movement, such as a magnet-scale or linear sensor, can be used as the measuring means 217, 218. The constitution thereof is well known, and its description is omitted. The measuring portion 210 further comprises a lens-shaped template measuring element 219 which is semi-cylindrical in horizontally section and is disposed on the other end portion of the upper slider 212, and a rotation shaft 220 which is mounted on a projection 212a on the other end portion of the upper slider 212 for freely erecting and falling the measuring element 219 in the movement direction of the upper slider 212.

The lens-shaped-template measuring element 219 comprises an erecting drive piece 219a which is disposed on the base (near the rotation shaft 220) and juts out toward an opposite side to a measurement surface side, and a switch operating piece 219b which juts out toward a side surface of the upper slider 212. A spring 221 is arranged between the side surface of the upper slider 212 and a side surface of the base of the erecting drive piece 219a.

When the measuring element 219 is laid down as shown in FIG. 7(a), the spring 221 is situated above the rotation shaft 220 and keeps the measuring element 219 at the laid-down position. When the measuring element 219 is erected as shown in FIG. 7(b), the spring 221 is situated under the rotation shaft 220 and keeps the measuring element 219 at the erected position.

At the erected position, the measuring element 219 does not fall to the right side in FIGS. 7(a) and 7(b) by means of a not-shown stopper. On the side surface of the upper slider 212, a micro-switch (sensor) 222 used as detection means for detecting that the measuring element 219 is laid down, and a micro-switch (sensor) 223 used as detection means for detecting that the measuring element 219 is erected.

In FIG. 7(a), when the motor 107 for moving the measurement portion is actuated and the slide base 105 is moved leftward in FIGS. 7(a) and 7(b), a front end of the erecting drive piece 219a is brought into contact with a plate portion 111b for erecting the lens-shaped-template feeler of the holder 111, and the measuring element 219 is rotated clockwise around the rotation shaft 220 against the force of the spring 221. Correspondingly to this rotation of the measuring element 219, the spring 221 goes beyond the rotation shaft 200 and moves upward, and the measuring element 219 is erected by the force of the spring 221, and is held at the erected position shown in FIG. 7(b) by the stopper (not shown) and the spring 221.

The micro-switch 222 is directly switched "ON" with the measuring surface of the measuring element 219 when the measuring element 219 is laid down, and is switched "ON" with the switch operation piece 219a when the measuring element 219 is erected. Reference numeral 208a denotes a stopper mounted on the supporting plate 208, reference numeral 224 denotes an arm attached to the supporting plate 208, and reference numeral 225 denotes a micro-switch (sensor) as detecting means mounted on a front end of the arm 224. The micro-switch 226 is switched "ON" when the upper slider 212 comes into contact with the slider stopper 208a, and detects an initial position of the upper slider 212.

(Measuring Force Adjusting Means PS)

The measuring force adjusting means (measuring force changing means, pressure adjusting means) PS comprises two guide rails 251 (one of which is not shown) which are laid under the supporting plates 207, 208 and provided parallelly with the guide rail 211, first lower sliders 400 which are disposed under the arm 224 and held movably longitudinally (same direction as the upper slider 212) on guide rails 251 (the other is not shown) and a drive motor 401 which is disposed under the lower sliders and fixed to the rotation base 202. Rack teeth 402 are arranged longitudinally on the lower surfaces of the first lower sliders 400. Fixed to an output shaft 401a of the drive motor 401 are gears 403 which are engaged with the rack teeth 402. Micro-switches 404 and 405 are fixed to the arm 224, which are spaced in the moved direction of the first sliders 400 to detect a position of the first sliders.

Further, on the side surface of the upper portion of the supporting plate 207, a pulley 226 is held rotatably, and an end of a wire 227 is fixed to an end of the upper slider 212. The other end of the wire 227 is engaged with an end of the spring 228 used as pressing means, and the other end of the spring 228 is mounted on a leading end of the first sliders 400. The wire 227 is disposed on the pulley 226.

(Measuring Element Positioning Means 250)

The measuring element positioning means 250 comprises the aforementioned two guide rails 251 (the other is not shown), a lower slider 252 which is held on the guide rails 251 to be horizontally movable in a longitudinal direction, a drive motor 253 which is disposed under the lower slider 252 and is fixed to the rotation base 202, and an engagement pin (stopper) 254 which is adjacent to the drive motor 253 and juts out from near the center of a side surface of the rotation base 202.

Rack teeth 255 are arranged in its movement direction under the lower slider 252, and engagement pins (stoppers) 256, 257 are spaced in the movement direction and are caused to jut out from the lower slider 252. A gear 258 engaged with the racks 255 is fixed to an output shaft of the driving motor 253. The engagement pin 256 is situated slightly higher than the engagement pin 257, and a shaft elevation operating member 259 is disposed on a side of the lower slider 252.

The shaft elevation operating member 259 is shaped like "L" which consists of a long piece 259a which is between the engagement pins 256, 257 and a short piece 259b which is obliquely formed integrally with the lower end of the long piece 259a. A curved part of the operating member 259 is rotatably held on a vertically middle portion of a side surface of the lower slider 252. A spring 261 is arranged between a front end of the short piece 259b and an upper portion of the side surface of the lower slider 252.

At a position where the long piece 259a is in contact with the engagement pin 256, the spring 261 is disposed right from the rotation shaft 260 and presses the long piece 259a against the engagement pin 256. At a position where the long piece 259a is in contact with the engagement pin 257, the spring 261 is disposed left from the rotation shaft 260 and presses the long piece 259a against the engagement pin 257.

A supporting plate 262 extending upward is attached to an end of the lower slider 252, and a pushing shaft 263 passing through an upper end of the supporting plate 262 is held on the supporting plate 262 so as to proceed and recede in a movement direction of the lower slider 252. A retainer 264 for preventing release is attached to an end of the pushing shaft 263. A large-diameter pushing portion 263a, which faces an end surface 212b of an end of the upper slider 212, is formed integrally with the other end of the pushing shaft 263. A spring 265 wound on the pushing shaft 263 is arranged between the large-diameter pushing portion 263a and the supporting plate 262. The pushing portion 263a is in contact with the end surface of the end of the upper slider 252 by means of the springs 228, 265.

The thus constructed measuring apparatus 1 is, as mentioned later, capable of obtaining the shape of the eyeglass frame MF or the shape of the lens-shaped template in the form of vector radius Pi relative to angle θi, in other words, in the form of lens shape information (θi, ρi) representing polar coordinates.

(Control Circuit for the Lens Shape (Measuring Apparatus)

Figure 3:
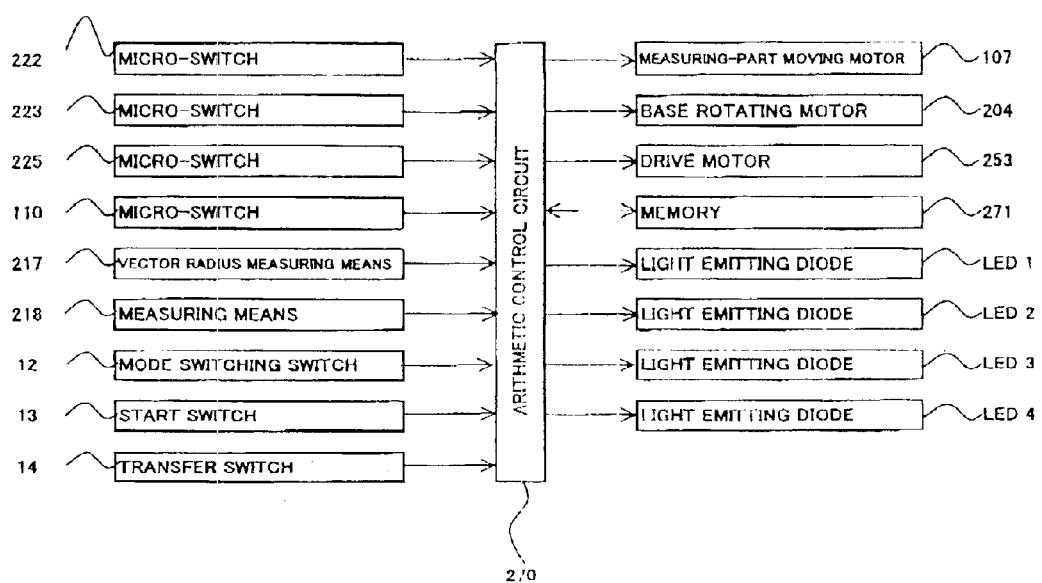
FIG. 3 is a view showing the control circuit of a frame shape measuring apparatus shown in FIG. 2($a$).

An arithmetic control circuit 270 (control means) as sown in FIG. 3 receives operational signals (ON and OFF signals) from the mode-switch 12, start-switch 13, transfer-switch 14. The light emitting diodes LED 1~4 corresponding to the their switches 12, 13 and 14 are controlled by means of the arithmetic control circuit 270.

Detecting signals from the micro-switches 110, 222, 223, 225, 404, 405 and so on are input into the arithmetic control circuit 270 as shown in FIG. 3 and a measuring signal from vector radius measuring means 217 and a measuring signal from the measuring means 218 are input into the arithmetic control circuit 270.

Further, the control circuit 270 controls the motors 107, 204, 253, 401. A memory for memorizing measuring data (memory means) is connected to the control circuit 270. The control circuit 270 acts as means for confirming a frame shape and measuring control means.

(2) Lens Edging Apparatus 2

Figure 2A:
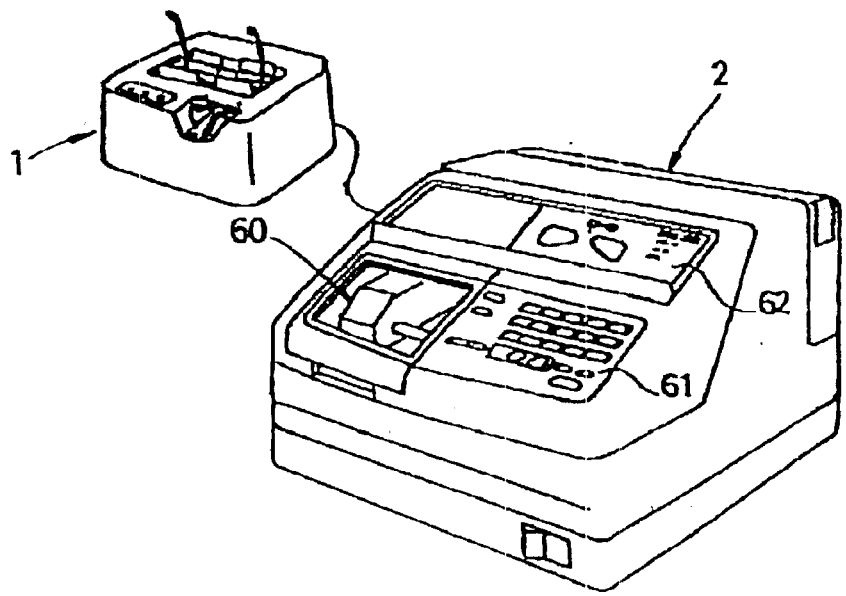
FIG. 2($a$) is a schematic perspective view of the apparatus provided with the control circuit shown in FIG. 1 and FIG. 2($b$) is an enlarged explanatory view of a control panel shown in FIGS. 1 and 2($a$).

As shown in FIG. 2(a), the lens edging apparatus 2 includes a grinding portion 60 (details are not depicted) that grinds the edge of an uncut lens. In the grinding portion 60, the uncut lens L (see FIG. 9) is held between a pair of lens-rotating shafts 304, 304 of a carriage, and the rotation of the shafts 304, 304 and the up and down movement of the carriage are controlled based on lens shape information (θi, ρi), and thus the edge of the uncut lens is ground with a grindstone. Since this structure of the grinding portion 60 is well known, a detailed description thereof is omitted.

The lens edging apparatus 2 further includes an operation panel portion (keyboard) 61 serving as a data input means, and a liquid crystal display panel (display device) 62 serving as a display means, and a control circuit (control means) 63 (see FIG. 1) that controls the grinding portion 60 and the liquid crystal display panel 62.

Figure 9:
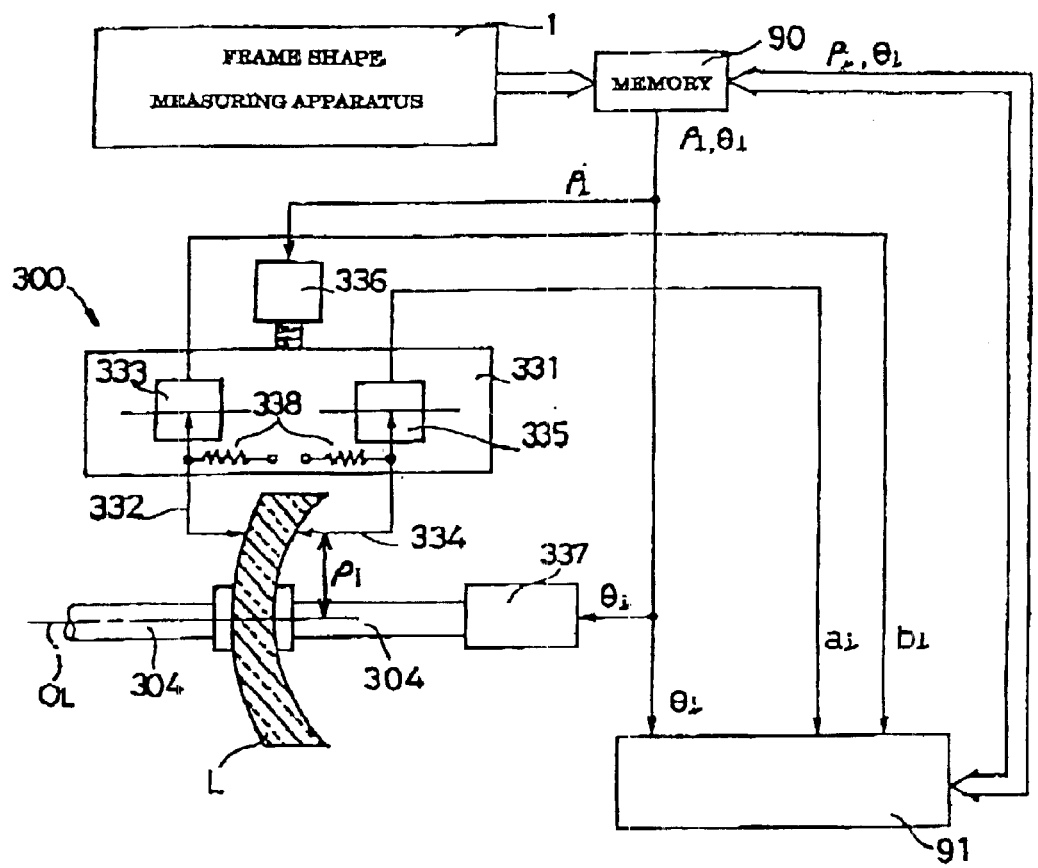
FIG. 9 is an explanatory view showing a lens-thickness measuring portion of a lens grinding machine shown in FIG. 2.

The lens edging apparatus 2 further includes a lens thickness measuring device 300 (lens thickness measuring means) that measures the thickness of the edge of the uncut lens, based on lens shape information (θi, ρi) obtained by the frame shape measuring apparatus 1, as shown in FIG. 9. The construction and operation of the lens thickness measuring device 300 are the same as those disclosed in Japanese Patent Application No. Hei 1-9468.

(Lens Thickness (Measuring Means)

A lens thickness measuring device (means for inputting a shape of edge thickness) has a stage 331 that is moved forward and rearward by a pulse motor 336. The lens thickness measuring device has feelers 332, 334 provided on the stage 331.

The feelers 332, 334 are energized in directions in which they approach each other by means of the force of springs 338, 338 so as to be always in contact with front and back surfaces (front and back refracting surfaces) of the uncut lens L, respectively. As shown in FIG. 10(A), the feelers 332, 334 have disks 332a, 334a that are freely rotatable, respectively. The disks 332a, 334a each have a radius of r. The lens rotating shafts 304, 304 of a carriage (not shown) are disposed to be driven and rotated by a pulse motor 337, and the uncut lens L is clamped between the lens rotating shafts 304, 304. Accordingly, the uncut lens L is driven and rotated by the pulse motor 337. The optical axis OL of the lens L is caused to coincide with the axial line of the lens rotating shafts 304, 304.

Angular information θi' of radius vector information (ρi, θi) from a memory 90 is input into the pulse motor 337, and, according to the angular information θi', the lens L is rotated from a reference position by an angle of θi. On the other hand, the radius vector length ρi is input into the pulse motor 336, and the disks 332a, 334a of the feelers 332, 334 are moved forwards and backwards through the stage 331 and are positioned at points away from the optical axis OL by the radius vector length ρi, as shown in FIG. 9. The quantities ai and bi (shown in FIG. 10(A)), of movement of the feelers 333, 335 at the points are then detected by encoders 333, 335, and detection signals from the encoders 333, 335 are input into an arithmetic/judgment circuit 91.

The arithmetic/judgment circuit 91 performs a calculation according to the formulas bi−ai=Di, Di−2r=Δi, and obtains a lens thickness Δi.

(Control Means, etc.)

Figure 2B:
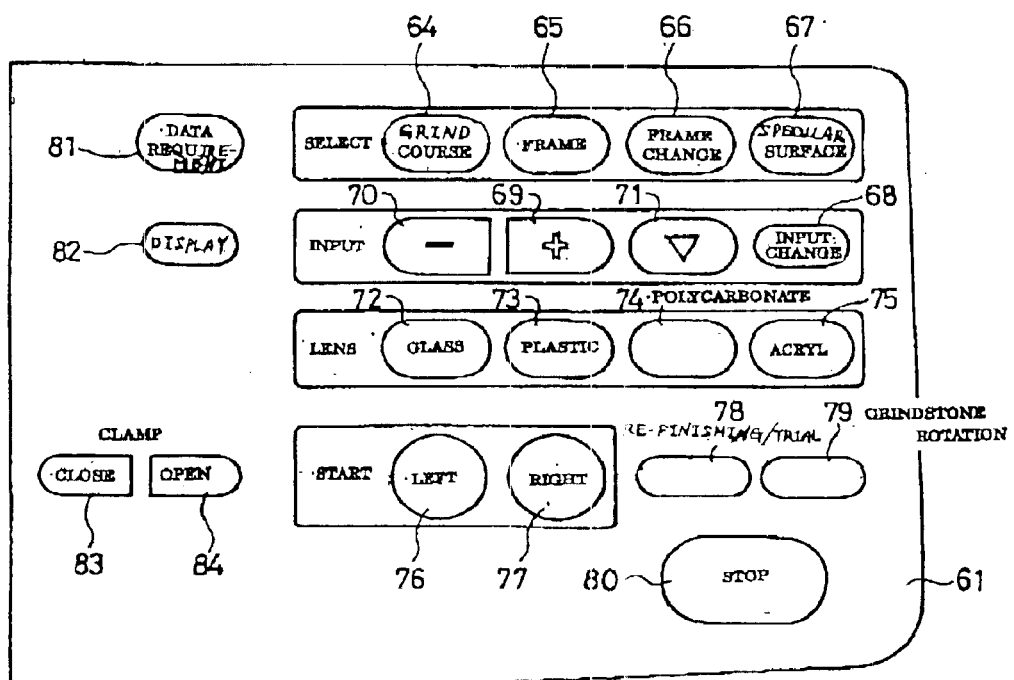

As shown in FIG. 2(b), the operation panel portion 61 has a grind course switch 64 for making a changeover among an "auto" mode in which the edge and V-edge of a lens are ground, a "monitor" mode of a manual operation, etc., a "frame" mode switch 65 for selecting the material of an eyeglass frame, a "frame change" mode switch 66 for putting old lenses into a new eyeglass frame without discarding the old lenses, and a "specular surface" mode switch 67 for specularly processing eyeglass lenses.

The operation panel portion 61 further has an "input change" mode switch 68 for a distance between pupils PD, a frame geometric center distance FPD, an set up UP, etc., a "+" input switch 69 for setting a "+ (plus)" input, a "−"

input switch 70 for setting a "– (minus)" input, a cursor key 71 for moving a cursor symbol 71a, a switch 72 for selecting glass as lens material, a switch 73 for selecting plastic as lens material, a switch 74 for selecting polycarbonate as lens material, a switch 75 for selecting acrylic resin as lens material.

The operation panel portion 61 further has a start switch including a switch 76 for grinding a "left" lens and a switch 77 for grinding a right" lens, a "re-finishing/trial" mode switch 78, a "grindstone rotation" switch 79, a stop switch 80, a data requirement switch 81, a display switch 82, a switch 83 for shutting the pair of clamping shafts of the grinding portion 60, a switch 84 for opening the pair of clamping shafts of the grinding portion 60, a switch 85 for starting the measurement of a lens thickness, a setting switch 86, etc.

As shown in FIG. 1, the control circuit 63 includes a lens frame shape memory 90 that stores lens shape information (θi, ρi) obtained from the frame shape measuring apparatus 1, the arithmetic/judgment circuit 91 into which the lens shape information (θi, ρi) is input from the lens frame shape memory 90, a sucking disk shape memory 92, a suction cup shape memory 92, an image formation circuit 93 in which image data is constructed based on the data obtained from the arithmetic/judgment circuit 91 and from the suction cup shape memory 92 and thereby a liquid crystal display panel 62 is caused to display images and data, an operation panel portion 61, a control circuit 94 that controls a caution buzzer, etc., by control commands of the arithmetic/judgment circuit 91, a grinding data memory 95 that stores grinding data obtained by the arithmetic/judgment circuit 91, and a grinding control portion 96 that controls the operation of the grinding portion 60 in accordance with the grinding data stored in the grinding data memory 95.

A description will next be given of the control performed by the arithmetic/judgment circuit 91 and the arithmetic control circuit 270 of the thus apparatus constructed as described above.

(i) Setting of an Eyeglass Frame MF in the Frame Shape (Measuring Apparatus 1

When the shape of the eyeglass frame MF is measured according to the aforementioned construction, a lens holder 111 shown in FIGS. 7(a) to 8(b) is kept removed from a holder supporter 109. In this construction, inclined guide plates 48c, 48c of frame guide members 48, 48 are inclined in a direction in which a space between them becomes progressively larger toward their upper ends.

Accordingly, as shown in FIG. 6(a), the eyeglass frame MF is disposed between the guide plates 48c, 48c and is then pressed from above against a force of the coil spring 40. As a result, the space between the frame guide members 48, 48, namely, the space between movable supporters (sliders) 37, 37 is enlarged according to the guide function of the guide plates 48c, 48c, and thereby the rim of the eyeglass frame MF, namely, the lens frame LF, (RF) of the eyeglass frame MF is moved onto holding claws 43, 43 and is fixedly held by the holding claws 43, 43. In this position, portions disposed upwardly and downwardly of the lens frames (rim) LF and RF are held between the vertical plate portions 48a, 48a of the frame guide members 48, 48 by means of a spring force of the coil spring 40.

In such state, the operation lever 27 is turned from the position "open" to the position "close". This turn is transmitted to the drum shaft 33 through the rotation shaft 25, gears 26, 24, and the operation shaft 23, and thereby a part of the spring 35 is wound around the drum shaft 33. Accordingly, the claw mounting plate 42 is turned upwards centering a side 42a of the plate 42 through the wire 36 connected to the spring 35, and the space between the claws 43, 44 is reduced as shown in FIG. 6(c). As a result, the lens frame LF (RF) is held between the claws 43, 44. At this position, the movable pin 31 is held at a lower portion 20a of the circular slit 20 by means of the force of the spring 32.

In order to remove the lens frame LF (RF) of the eyeglass frame MF from between the claws 43, 44, the operation lever 27 is operated reversely to the above-mentioned operation, and thereby each member operates reversely.

(ii) Lens Frame-shape Measurement

A. (Measurement of a Shape of Lens Frames of an Eyeglass Frame)

<(Measurement for Width and Thickness of Rim of the Lens Frames>

In the state that the rim or the lens frame LF of the eyeglass frame MF is held between the holding claws 43, 44 of the movable supporters 37, 37, the measuring element 216 is adapted to oppose to the substantial central of the space inside the lens frame LF from the downward direction thereof. On the other hand, when an electric power supply of the frame shape measuring apparatus 1 is turned on, signals from micro switches 110, 222, 223, 225 are input into the arithmetic control circuit 270 which is arithmetic/judgment means (arithmetic/judgment control circuit) of the frame shape measuring apparatus 1, and the control circuit 270 judges detection states of the micro switches 110, 222, 223, 225.

In FIG. 11(a), a long portion 259a of a shaft elevation operating member 259 is in contact with a stopper pin 257 by the elastic force of a spring 261. In this position, the measuring element 216 is located at a stand-by position (α). In the following description, measurement is set, for example, such that the lens frame RF of the eyeglass frame MF is measured after the measurement of the lens frame LF thereof is completed.

Figure 12A:
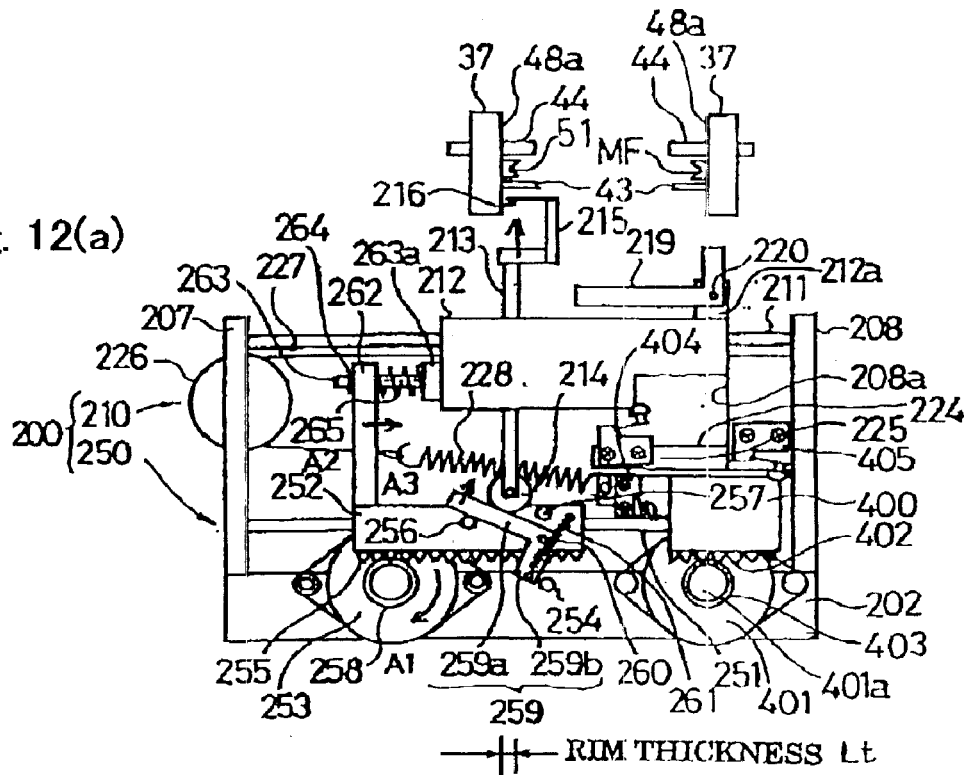
FIG. 12 is an explanatory view showing measurement of thickness of rim.

When the control circuit 270 turns on a start switch 13 at the stand-by position (a), the motor 107 is driven and then rotates the feed screw 106 to move the slide base 105 toward the motor 107. Therefore, the rotation base 202 is moved together with the slide base 105 to the side of the motor 107 and the measuring element 216 of the measuring shaft 213 supported on the upper slider 212 of the rotation base 202 contacts with the vertical plate portion 48a of one of the movable supporters 37, 37, as shown in FIG. 12(a).

The arithmetic control circuit 270 then stops the motor 107 when the circuit receives detecting signals from the vector radius measuring means 217 at the time of contacting the measuring element 216 with the vertical plate portion 48a of the movable supporter 37.

According to this, the arithmetic control circuit 270 obtains the moved amount of the slide base 105 from the amount of drive of the motor 107 until the motor 107 is stopped and obtains a position of the measuring element 216 based on the above moved amount and detecting signal from the vector radius measuring means 217 to store this position in the memory 271 as an external position of the rim.

Thereafter, the arithmetic control means 270 rotates reversely the motor 107 to move oppositely the slide base 105 to the motor 107 and the measuring element 216 is moved to a position facing to the substantial central of the space inside the lens frame LF to stop the motor 107.

The control circuit 270 then actuates a drive motor 253, and, as shown by arrow A1, rotates a gear 258 clockwise, and thereafter moves a lower slider 252 rightward in FIG. 11(a), and, as shown by arrow A2, moves rightward an upper slider 212 by means of a pressure shaft 263, as viewed in the drawing to contact the long piece 259b of the shaft elevation operating member 259 with the engagement pin 254.

Thereafter, the arithmetic control circuit 270 moves still rightward the lower slider 252 to rotate clockwise the shaft elevation operating member 259 about the rotation shaft 260 as shown in arrow A3, thus moving upwardly (UP) the measuring shaft 213 through the roller 214 by shaft elevation operating member 259, from the stand-by position (a). According to this, when the spring 261 moves upwardly of the rotation shaft 260, the shaft elevation operating member 259 is rotated rapidly by a spring force of the spring 260 to contact the long piece 259a of the shaft elevation operating member 259 with the engagement pin 254. By inertia of the member occurred at this time, the measuring shaft 213 is moved upwardly to elevate rapidly the measuring shaft 216 to the leap position (b) of a substantial upper edge of the lens frame LF. Thereafter, the measuring shaft 213 and measuring element 216 are slightly downwardly moved to contact the roller 214 with the short piece 259b and the measuring element 216 is positioned at the measuring element insertion position (feeler insertion position) (c) facing to a valley of the V-shaped groove of the lens frame LF, as shown in FIG. 11(c).

Corresponding to this movement, when the measuring element 216 is moved upwardly into the measuring element insertion position (c), the micro-switch 225 is turned on by the upper slider 212. When the arithmetic control circuit 270 receives the on signal from the micro-switch 225, it rotates reversely the drive motor 253 to rotate the gear 258 in counter-clockwise as shown in arrow A5 in FIG. 11(b) and then moves the lower slider 252 in leftward as shown by arrow A5 to engage the leading end of the measuring element 216 with the valley (center) of the V-shaped groove 51 of the lens frame LF.

Further, when the arithmetic control circuit 270 receives the detecting signal from the vector radius measuring means 217 at the time of contacting the leading end of the measuring element 216 with the valley of the V-shaped groove 51 of the lens frame LF, the circuit stops the drive motor 253. In this case, the arithmetic control circuit gets a position of the measuring element 216 based on the amount of movement of the drive motor 253 and the detecting signal from vector radius measuring means 217 and then this position is stored in the memory 271 as rim groove position (position of V-groove, or lens frame). The arithmetic control circuit 270 obtains a difference between the rim external surface position and rim groove position and then this difference is stored in the memory 271 as width of rim (thickness of rim) Lt of the lens frame LF.

Figure 19:
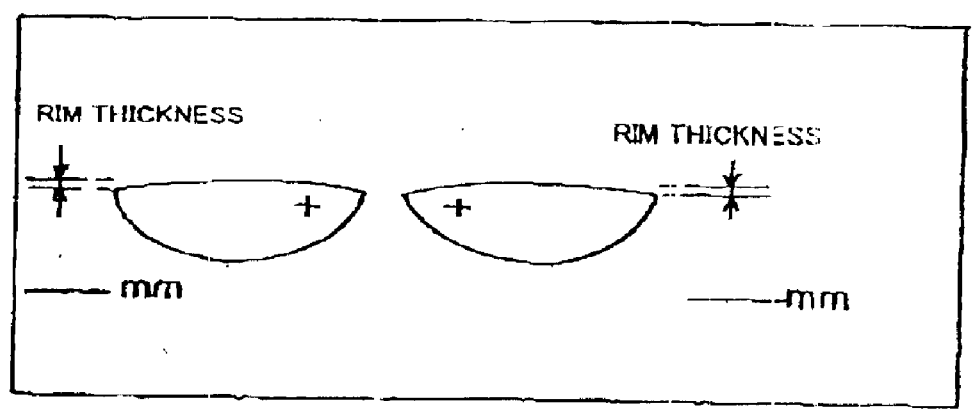
FIG. 19 is an explanatory view showing a result of measurement of the lens frames.

As shown in FIG. 19, the arithmetic control circuit 270 displays numerically rim thickness of right and left lens frames FR and FL instead of side images of eyeglass lenses inserted in the lens frames FR and F1 in the liquid crystal displaying panel (display device) 62 in FIG. 1.

Figure 8A:
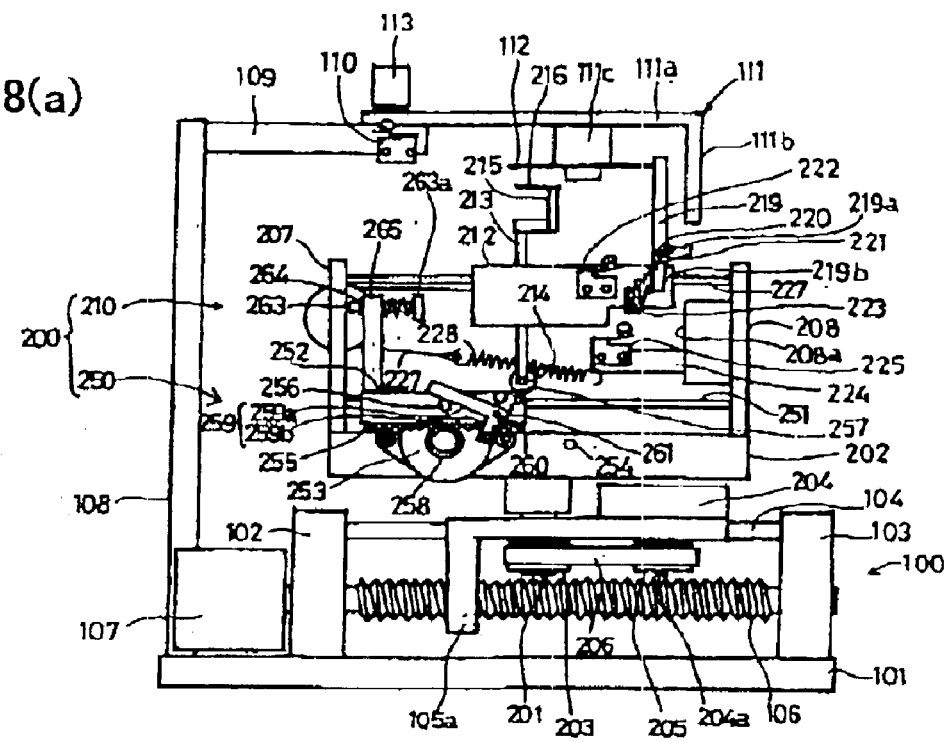
FIGS. 8($a$) and 8($b$) are explanatory views of the frame shape measuring section, etc. of the frame measuring apparatus.
Figure 8B:
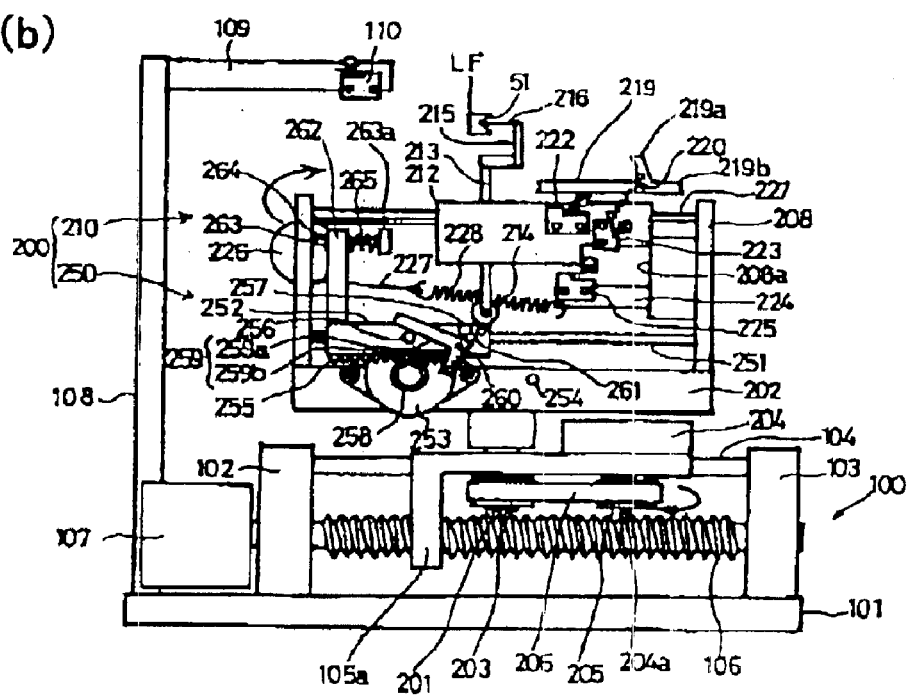
Figure 12B:
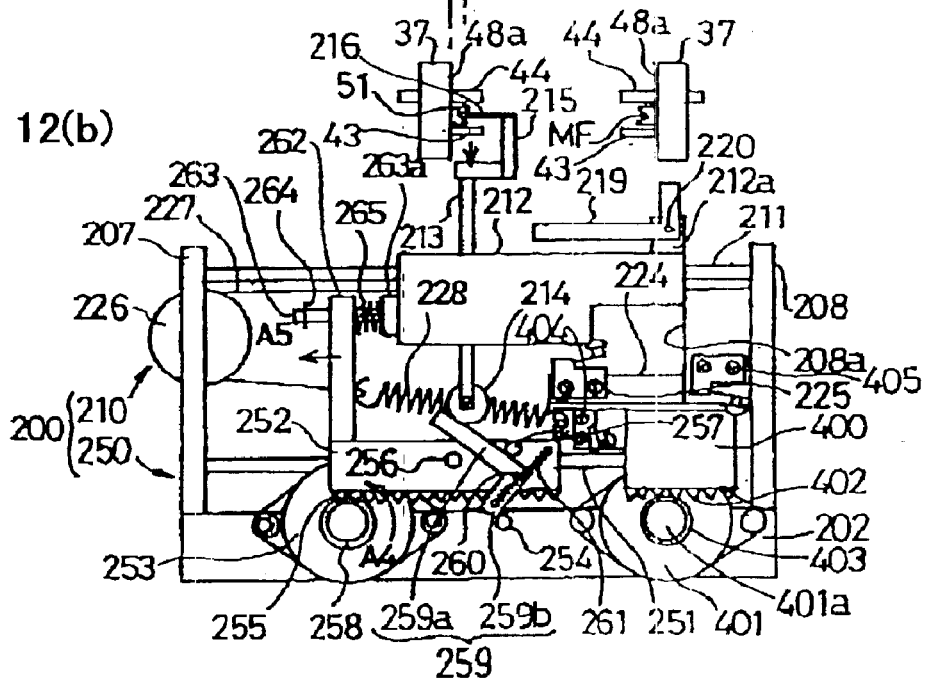

Thereafter, when the lower slider 252 is further moved leftward as shown by arrow A5 in FIG. 11(b) and FIG. 12(b), the pressure part 263a of the pressure shaft 263 is spaced apart from the upper slider 212 as shown in FIG. 8(b). In this position, the measuring element 216 is abutted with the valley of the V-shaped groove 51 of the lens frame LF by means of the elastic force of the spring 228 as shown in FIG. 8(b).

In this state, the control circuit 270 drives and controls the base rotating motor 204 so that the front (leading) end of the measuring element 216 is moved along the V-shaped groove 51 of the lens frame LF. Corresponding to this movement, the upper slider 212 is moved along a guide rail 211 according to the shape of the V-shaped groove, and the measurement shaft 213 is moved upward or downward according to the shape of the V-shaped groove.

Thereafter, the movement of the upper slider 212 is detected by a radius vector measuring means 217, and the up and down movement of the measurement shaft 213 is detected by a measuring means 218.

Note that the radius vector measuring means 217 calculates the quantity of movement of the upper slider 212 starting from the position where the upper slider 212 is in contact with a stopper 208a of a supporting plate 208. The outputs of the measuring means 217, 218 are input to the control circuit 270.

The control circuit 270 calculates a radius vector Pi of the valley of the V-shaped groove 51 of the lens frame LF, based on the output from the measuring means 217, and allows a memory (not shown) to store radius vector information ($\theta i$, $\rho i$) obtained by correlating the radius vector $\rho i$ with the rotation angle $\theta i$ of the base rotating motor 204. On the other hand, the arithmetic control circuit calculates the quantity Zi of movement in the up and down direction (i.e., Z-axis direction), based on the output from the measuring means 218, and allows the memory (not shown) to store lens frame shape information ($\theta i$, $\rho i$, $Z i$) obtained by correlating the quantity Zi of movement with both the rotation angle $\theta i$ and the radius vector $\rho i$.

C. Determine and Shape (Measurement for Elongate Lens Frames

Hereinafter, a measurement of elongate lens frames 272 as shown in FIG. 13 will be explained.

(1) (Measuring Example 1

Figure 13A:
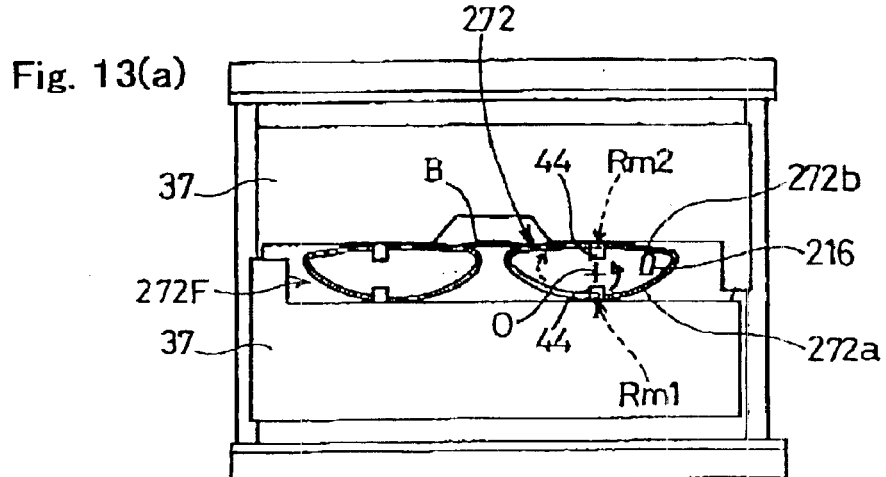
FIG. 13 is an explanatory view showing setting of a time of one revolution of a measuring element about lens frames.

First, the elongate lens frames 272 to be measured are disposed between the movable supporters 37,37 as shown in FIG. 13(A) and the arithmetic control circuit 270 judges whether the elongate lens frames to be measured or normal lens frames.

Here, the center between the movable supporters 37,37 and lens frames 272 (between rims 272a, 272b) becomes a movement starting position in the leading end of the measuring element 216. When viewed from the front of the elongate lens frames 272, a position adjacent to the center of a lower rim 272a of the lens frames 272 is a measurement starting position Rm1. Reference numeral 272b denotes an upper rim of the lens frames. First, the arithmetic control circuit 270 disposes the upper slider 212 in a position as shown in FIG. 11(b) by means of the drive motor 253. In this state, the circuit starts the drive motor 107 and moves the slide base 105 and upper slider 212 in rightward and leftward and further drives and controls the drive motor 204 to rotate the rotation shaft 201 and rotation base 202, thus causing the leading end of the measuring element 216 to position in the movement starting position P1 as shown in FIG. 13(c).

In this movement starting position P1, the leading end of the measuring element 216 opposes to grooves (not shown) in the lens frames which are substantially same as the V-shaped grooves 51 in configuration, in the measurement starting position Rm1.

Next, the arithmetic control circuit 270 controls the drive motor 253 and moves the lower slider 252 and the pressure portion 263a in leftward as shown by arrow A5 in FIG. 12(b).

Figure 13B:
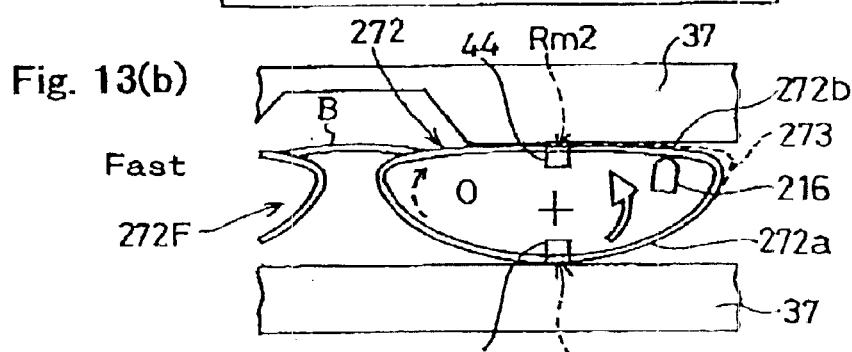
Figure 13C:
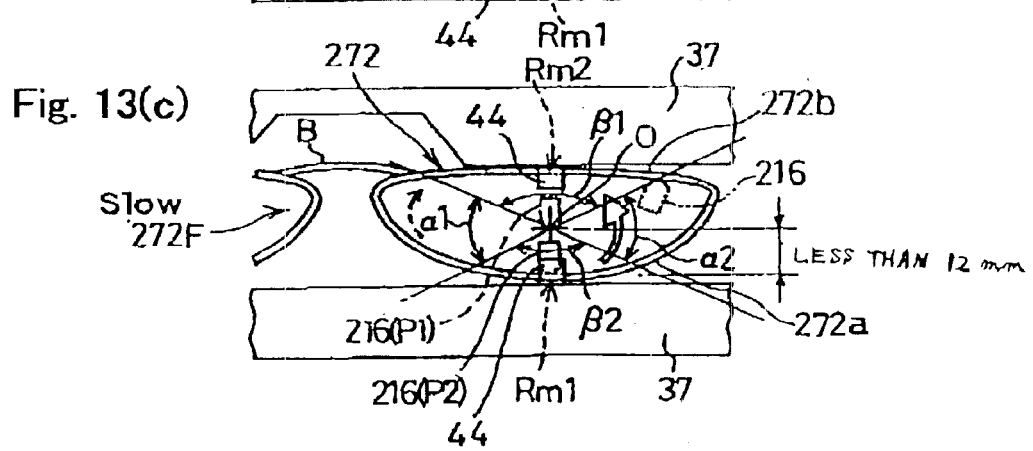
Figure 14A:
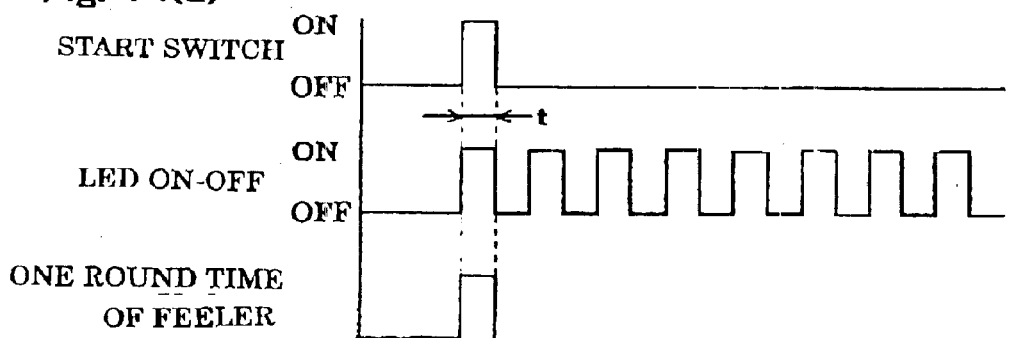
FIG. 14 is an explanatory view showing measurement of elongate (crab's eye shaped) lens frames.
Figure 14B:
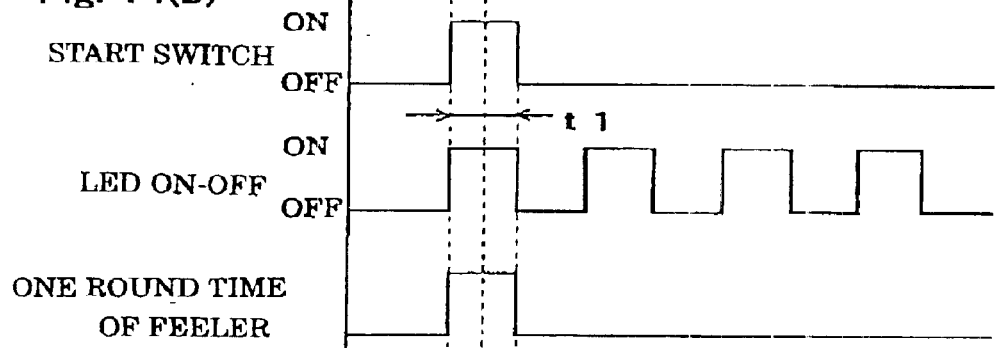
Figure 14C:
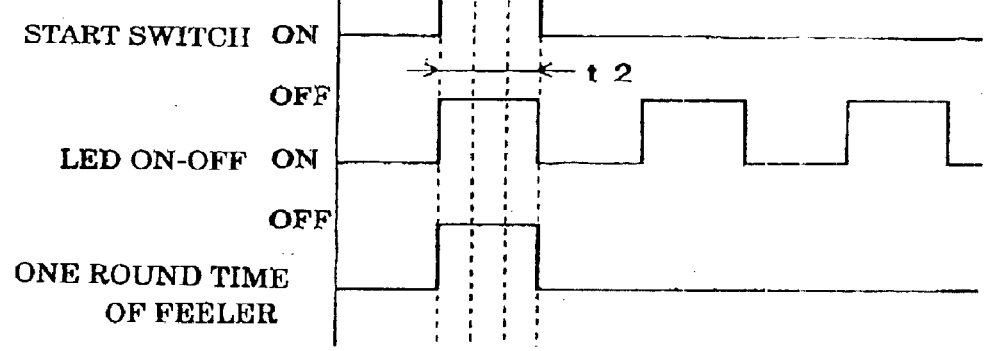

In this case, the upper slider 212 is moved in leftward following to the pressure portion 263a by a spring force of the spring 228 and the leading end of the measuring element 216 in the upper slider 212 moves to a position P2 adjacent to the center of the lower rim 272a of the lens frames 272 as shown in FIG. 13(c) to contact the leading end of the measuring element 216 with a V-shaped groove (not shown) of the lens frames 272 similar to the V-shaped groove 51 in the measurement starting position Rm1.

Thereafter, the control circuit 270 drives and controls the motor 253 and moves the lower slider 252 in further leftward as shown by arrow A5 in FIG. 12(b) to move the pressure portion 263 a in leftward and therefore the pressure portion 263a is spaced apart from the upper slider 212 as shown in FIG. 8(b).

In this case, the arithmetic control circuit 270 detects an amount of movement of the measuring element 216 from the movement starting position P1 of the measuring element (feeler) 216 to a position P2 in which the measuring element 216 contacts initially with the lower rim 272a, by the vector radius measuring means (feeler movement detecting means) 217.

The arithmetic control circuit 270 also judges a shape of the lens frames from the detected amount of movement of the measuring element. In other words, the arithmetic control circuit 270 obtains a distance from a rotation center O of the measuring element 216 to the measurement starting position Rm1 and then if the obtained distance is less than a predetermined value (for example, 12 mm), it is determined that lens frames to be measured are the elongate (crab's eye-shaped) lens frames 272.

Here, when the normal lens frames are measured, if revolution of the drive motor 204 is N rpm, the drive motor 204 is controlled by this revolution to rotate the rotation shaft 201 and rotation base 202, thus rotating (about the center O of rotation) the measuring element 216 in order performs measurement of a shape of the lens frames. If rotational speed of the measuring element 216 has a normal rotational speed (Fast) and if the elongate lens frames 272 to be measured are formed with a soft material and so on, when a shape of the lens frames is measured by the measuring element 216 rotating with the normal rotational speed, the lens frames 272 are deformed by a force of movement of the measuring element 216 as shown by dotted lines 273 in FIG. 13(b). That is, a nose pads, ear hooks or the others of the elongate lens frames 272 are deformed and therefore vector radius thereof can not be measured correctly.

Accordingly, if the lens frames measured as described above are determined as being the elongate lens frames 272, the arithmetic control circuit 270 shifts to a sequence of slow rotation in which rotational speed of the drive motor 204 is set into NS rpm which is less than the N rpm (for example, Ns=N/2 rpm), and speed of movement of the measuring element 216, namely, rotational speed of the rotation shaft 201 and rotation base 202 arc slow. Thus, the arithmetic control circuit 270 allows the measuring element 216 to measure a shape of the elongate lens frames 272 in accordance with the slow rotation sequence. In this case, since the rotational speed of the measuring element 216 is sufficiently slow than a normal rotational speed, the measuring element 216 can measure the rims of the lens frames 272 without deforming as shown in FIG. 13(c). Consequently, since the ear hooks, nose pads and so on of the elongate lens frames made of soft material are not deformed resiliently and bent, a correct measurement of the lens frames can be always performed without occurring incorrect measurement resulting from deformation of the lens frames.

(2) (Measuring Example 2

The arithmetic control circuit 270 sets the measuring element 216 Into a slow rotational speed, in a predetermined angular scope α1 of the nose pads side or a predetermined angular scope α2 of the ear hooking portion side, but, varies the rotational speed of the measuring element 216 in a normal rotational speed in the other angular scopes β1 and β2.

In this case, since speed in portions at which the rims are easily deformable in the angular scope α1 of the side of the nose pads of the elongate lens frames 272 or the angular scope α2 of the side of the ear hooks is slow, the elongate lens frames 272 do not deform by the rotational speed thereof in that portions. Furthermore, since the upper and lower rims 272a and 272b of the lens frames 272 are substantially linear in the angular scopes β1 and β2, even though speed of movement of the measuring element 216 is large than the normal rotational speed within the angular scopes β1 and β2, the upper and lower rims 272a and 272b are not bent or deformed by rotation of the measuring element 216. Accordingly, it is possible to measure a shape of the lens frames 272 with a more short measuring time than that in the measuring example 1, which is movement time of the measuring element 216 shorter than the normal rotational speed within the angular scopes β1 and β2.

(3) (Measuring Example 3
(Preliminary (Measurement)

First, the elongate lens frames are disposed between the movable supporters 37,37 as shown in FIG. 13(A) and the arithmetic control circuit 270 judges whether the elongate lens frames or the normal lens frames by means of the following preliminary measurement.

The arithmetic control circuit 270 sets the vicinity of center of the lower rim, contacting with the measuring element (feeler, contact) 216 as a measurement starting position Rm1, as viewed from the front of the lens frames 272. In other words, the arithmetic control circuit 270 controls the drive motor 204 and positions the rotation shaft 201 and rotational lease 202 at a position of contacting the measuring element 216 with grooves of the lens frames 272 in the center of the lower rim 272a (measurement starting position Rm1), as viewed from the front of the lens frames 272. The arithmetic control circuit 270 then obtains vector radius ρ0 of the lens frames 272 in the measurement starting position Rm 1 from a signal of measurement by the vector radius measuring means 217 at this time and the obtained vector radius ρ0 is stored in the memory 271. Next, the arithmetic control circuit 270 controls the drive motor 204 and rotates the rotation shaft 201 approximate 180° and rotates the rotation base 202 approximate 180° and then moves the measuring element 216 from the measurement starting position Rm 1 to a position Rm 2 in the vicinity of the center of the upper rim 272b as viewed from the front of the elongate lens frame 272F. The arithmetic control circuit 270 obtains vector radius ρ180 of the lens frames 272 in the position Rm 2 based on the measured signal from the vector radius measuring means 217 when the measuring element 216 is moved into the opposite position Rm to the vicinity of the measurement starting position Rm 1 and the obtained vector radius ρ180 is stored in the memory 271. Then, the arithmetic control circuit 270 obtains the seem of the vector radius in the measurement starting position Rm 1and vector radius ρ180 in the position Rm 2, as a space (=ρ0+180) between the upper and lower rims. If a half the space D, D/2 is calculated and D/2 is less than a predetermined value (for example, 12 mm), the arithmetic control circuit 270 determines that lens frames to be measured are the elongate lens frames 272.

(Main (Measurement)

Here, when the normal lens frames are measured, if revolution of the drive motor 204 is N rpm, the drive motor 204 is controlled by this revolution to rotate the rotation shaft 201 and rotation base 202, thus rotating (about the center O of rotation) the measuring element 216 in order performs measurement of a shape of the lens frames. If rotational speed of the measuring element 216 is a normal rotational speed (Fast) and if the elongate lens frames 272 to be measured are formed with a soft material and so on, when a shape of the lens frames is measured by the measuring element 216 rotating with the normal rotational speed, the lens frames 272 are deformed by the force of movement of the measuring element 216 as shown by dotted lines 273 in FIG. 13(B). That is, the nose pads, ear hooks or the others of the elongate lens frames 272 are deformed and therefore vector radius thereof can not be measured correctly.

Accordingly, if the lens frames measured as described above are determined as being the elongate lens frames 272, the arithmetic control circuit 270 shifts to a sequence of slow rotation in which rotational speed of the drive motor 204 is set into NS rpm which is less than the N rpm (for example, Ns=N/2 rpm), and speed of movement of the measuring element 216, namely, rotational speed of the rotation shaft 201 and rotation base 202 are slow. Thus, the arithmetic control circuit 270 allows the measuring element 216 to measure a shape of the elongate lens frames 272 in accordance with the slow rotation sequence. In this case, since the rotational speed of the measuring element 216 is sufficiently slow than a normal rotational speed, the measuring element 216 can measure the rims of the lens frames 272 without being deformed as shown in FIG. 13(c).

Also, a measured part of the lens frames 272 measured by measuring element 216 in which the rotational speed is varied may be all portions of the lens frames without being limited to the side of the ear hooks or nose pads.

Further, the apparatus is adapted to set optionally the measured part by varying the rotational speed of the measuring element 216. Either the frame shape measuring apparatus 1 or grinding apparatus 2 is provided with means, for example, a key for setting a measured part of the lens frames, which is adapted to set a measured part such as ear hooks, nose pads, eye brow portions and cheek portions.

A display means having a screen for displaying a lens shape may be provided in either of the apparatuses, by which the set measured part can be displayed on the screen with color, thickness of lines of the lens shape or on and off of the lines and so on.

Consequently, since the ear hooks, nose pads and so on of the elongate lens frames made of soft material are not deformed resiliently and bent, a correct measurement of the lens frames can be always performed without occurring incorrect measurement resulting from deformation of the lens frames.

It is also possible to perform a precise measurement of shape of lens frames, since an incorrect measurement for the lens frames resulted from deformation or bending thereof can be minimized by varying a rotational direction of the measuring element 216, without changing only the rotational speed thereof.

For example, in the elongate lens frames 272 as shown in FIG. 13, the lower rim 272a is adapted to curve largely till the upper rim 272b at the right and left nose pads and ear hooks and the curves of the right and left portions of the upper rim 272b are less than that of the lower rim. In such case, when the measuring element 216 is moved in a direction shown by the arrow of solid line by contacting the measuring element 216 with the lens frames 272, as the measuring element 216 moves from the lower rim 272a to the upper rim 272b, if a sudden deforming force is applied on the ear hook of the upper rim 272b, it deforms as shown by broken lines. A bridge B is provided on the nose pad (left side) of the upper rim 272b. When the measuring element 216 is moved in a direction as shown by the arrow of broken lines while contacting it with the lens frames 272 and the measuring element 216 is moved from the lower rim 272a to the upper rim 272b, even though a sudden deforming force is applied to the nose pad of the upper rim 272b, the deformation in the ear hook (right side) of the upper rim 272b as shown by the broken lines is not blocked by means of the bridge B.

Under such circumstances, the following control will be performed by aforementioned the arithmetic control circuit 270. In case of the lens frames 272 as shown in FIG. 13, the arithmetic control circuit 270 judges that the lens frames are the elongate (crab's eye-shaped) lens frames and the curves of the right and left portions of the lower rim 272a are large and the curves of the right and left portions of the upper rim 272b are less. In this case, the arithmetic control circuit 270 controls the moved direction of the measuring element in a direction as shown by dotted lines in FIG. 13(B).

In other words, the arithmetic control circuit 270 controls the rotational direction of the measuring element to move while contacting from the lower rim 272a to the upper rim 272b at the nose pad (side of the bridge B). Consequently, a measuring state in which the upper rim 272a is not subjected to a sudden deforming force from the measuring element 216 at the side of ear hook is kept. In this way, it is possible to minimize a deformation of shape of the lens frames at the side of the ear hook by rotating the measuring element 216 in the direction of arrow showing by dotted lines in FIG. 13(B).

From the above, it is possible to perform precise measurement of the shape of lens frames without having further deformation or bending of the lens frames by controlling rotation of the measuring element 216 together with the slow rotation sequence. Note that this is also applied similarly in case of rapid movement speed of the measuring element 216.

(4) Mesuring Example 4

Although whether or not the eyeglass frames are the elongate lens frames is detected automatically and if they are elongate lens frames, the circuit controls automatically to become late a time of one revolution (rotational speed) of the measuring element along the lens frames, the present invention is not limited to this example. For example, an operator may set manually the time of one revolution of the measuring element.

This construction will be explained below.

The arithmetic control circuit 270 drives and controls the base rotation motor 204 with a normal rotational speed (rotation speed of default) if the on-signal input by the start switch 13 which has been pressed is less than a predetermined (set) time. In this case, a rotational speed which the rotation shaft 201 rotates by one revolution, namely, a time in which the measuring element 216 rotates by one revolution about the V-shaped groove 51 of the lens frames is preset.

If the above on-signal is more than the predetermined time, the arithmetic control circuit 270 sets optionally the rotational speed of the base rotation motor 204 with a time in which the start switch 13 is pressed (time which the on-signal is input). As a result, the time in which the measuring element 216 rotates by one revolution about the V-shaped groove 51 is set optionally during time which the start switch 13 is pressed. Further, the arithmetic control circuit 270 causes the light emitting diode LED3 to light-emit while pressing the start switch 13 (on-state) and thereafter performs to turn on-off alternately the light emitting diode with an interval of this light emitting time t.

Consequently, one revolution of the rotation shaft 201 by means of drive control of the base rotation motor 204 can be changed optionally and continuously according to needs and it is possible to grip easily time of the one revolution of the measuring element based on the internal t in which the light emitting diode LED3 is turned on-off. Note that the time in which the start switch 13 is pressed is measured by time measuring means provided in the arithmetic control circuit 270.

The arithmetic control circuit also receives the on-signal from the start switch 13 and after the above one revolution speed is set, receives the off-signal from the start switch 13 to control the base rotation motor 204 in response to the aforementioned set time and then controls the measuring element 216 to move peripherally along the V-shaped groove 51 of each lens frame, thus starting the measurement of the lens frames.

The arithmetic control circuit 270 also stops the base rotation motor 204 when receiving the on-signal from the start switch 13 after starting such measurement.

With such construction, the start switch 13 acts as a setting switch of the measuring element (feeler), an actuating switch of rotation of the measuring clement and a stopping switch of rotation of the measuring element.

If the on-signal input from the start switch 13 is more than the predetermined time (set time), the rotational speed of the base rotation motor 204 may be set gradually (step by step) with the time in which the start switch 13 is pressed. For example, the time (rotational speed) in which the measuring element 216 rotates by one revolution about each lens frame may be changed in five steps. If the five steps are set, the time of pressing the start switch 13 is measured by the time measuring means provided in the arithmetic control circuit 270. A mode of supper high speed→high speed→middle speed→slow speed→very slow speed is defined conveniently herein. Here, the time per one round about each lens frame corresponds to the time of pressuring the start switch.

Also, this time (rotational speed) is not limited to a constant time and can be varied gradually, for example, with two steps, three steps, four steps and so on. Further, the aforementioned time (rotational speed) of the measuring element 216 may be set freely by providing a speed display means such as a liquid crystal display and so on for displaying the time as described above. Furthermore, in case of changing the direction (direction of rotation) of movement of the measuring element 216 along the lens frames, both the mode and start switches 12 and 13 are pressed to rotate the measuring element in clockwise and counterclockwise directions. For example, it is set that if the start switch 13 is pressed one time while pressing the mode switch 12, the measuring element rotates in clockwise direction and if the start switch 13 is pressed two times with a short time while pressing the mode switch 12, the measuring element rotates in counterclockwise direction. This control is performed by means of the arithmetic control circuit 270. In this way, the operator varies optionally the direction of movement of the measuring element 216 and therefore if lens frames to be measured are the elongate (crab's eye shaped) lens frames, it is possible to vary optionally the direction of rotation of the measuring element in the right and left portions of the lens frames and temples which are easily deformable. In this case, it is preferable that the rotational direction of the measuring element is set corresponding to the direction in which the lens frames are not subjected to a large deformation as in the measuring example 3.

D. Change of (Measuring Force ((Measuring Pressure)

(i) Changing Example 1

In the measuring examples 1 to 3 as described above, the arithmetic control circuit 270 controls the drive motor 401 to move the first slider 400 in the side of the supporting plate 208 by means of the gear 403 which rotates together with the output shaft 401$a$ of the drive motor 401 and rack teeth 402 if the arithmetic control circuit judges that The lens frames to be measured are not the elongate lens frames. In response to the movement of the first slider, the lower slider 400 turns on the micro-switch 405 and the occurred on-signal is input in the arithmetic control circuit 270 which in turn stops the drive motor 401 in such a manner that the slider 400 is positioned in the side of the supporting plate 208. In this state, the slider is positioned in a right end of the supporting plate in which a force of pulling the spring 228 is large.

Accordingly, in this case, a pressed force (measuring force=measuring pressure) in which the measuring element 216 presses the lens frames is strong and the rotational speed (movement speed) of the measuring element 216 is fast as in case of measuring the normal lens frames.

In the aforementioned measuring examples 1 to 3, when the arithmetic control circuit 270 judges that lens frames to be measured are the elongate lens frames, the drive motor 401 is rotated reversely opposite to the above and the first slider 400 is moved in the opposite side to the supporting plate 208$b$ the gear 403 which rotates with the output shaft 401$a$ of the drive motor 401 and rack teeth 402. According to this movement, the lower slider 400 turns on the micro-switch 404 and then this on-signal is input in the arithmetic control circuit 270 which in turn stops the drive motor 401. In this state, a force of pulling the spring 228 is weak than that of the case that the lower slider 400 is positioned at the most approached position to the supporting plate 208, because the lower slider 400 moves in the side of the supporting plate 207 by a predetermined distance.

According, in case of the elongate lens frames, it is set that the pressed force in which the measuring element 216 presses the lens frames is weak. As described in the measuring examples 1 to 3, it is possible to further minimize deformation of the nose pads, ear hooks and the periphery by means of the pressed force of the measuring element 216 and to enhance precision of measurement, by slowing the rotational speed (movement speed) of the measuring element 216 than in case of measurement of the normal lens frames, or by slowing the rotational speed of the measuring element 216 than that of measurement of the normal lens frames within the angular scopes of the nose pads and ear hooks of the elongate lens frames.

In the aforementioned measuring examples, if the elongate lens frames are measured, the rotational speed of the measuring element 216 is slowed than that of the normal lens frames and the pressed force of the measuring element against the elongate lens frames is set to be less than that of the normal lens frames. However, the present invention is not limited to this. In other words, if the elongate lens frames 272 are measured, it is also possible to become less only the pressed force of measuring element against the lens frames than that of the normal lens frames, without slowing the rotational speed of the measuring element 216 than that in case of the normal lens frames. As described above, if the width of the rim is less than a predetermined value and the lens frames are easy to deform, it is possible to further become less deformation of the nose pads and ear hooks and to enhance precision of measurement with a less measuring force of the measuring element. Although this control is performed by means of the arithmetic circuit 270, the control by the arithmetic control circuit is applied to measurement of the normal lens frames.

Further, in normal lens frames, if the width of rim is less and they are easy to deform, the lens frames may be measured with a slow rotational speed of the measuring element, or with a less measuring force.

E. Others

A space measuring means may be provided for measuring a space between the movable supporters 37,37.

A space between the upper and lower rims of the lens frames kept between the movable supporters 37,37 is obtained by means of the space measuring means. Whether or not a half the obtained space is a predetermined value (for example 12 mm) is judged. In this case, since the main measurement can be performed immediately without carrying-out the preliminary measurement, the measuring time can be shortened.

A linear encoder, rotary encoder or magnet-scale, potentio-meter or the like may be used as the space measuring means.

(Measurement of a Lens Shape or a Template, a Demonstration Lens and so on)

In a case in which a lens shape of a template, a demonstration lens and so on is measured by use of a lens holder 111 as shown in FIG. 7(*a*), the motor 107 for moving a measuring part is moved to move the slide base 105 in leftward direction in FIG. 7. Consequently, the leading end of the erected drive piece 219*a* abuts with the feeler erecting plate portion 111*b* of the lens shape holder 111 to rotate the measuring element 219 about the rotation shaft 220 in clockwise direction against a spring force of the spring 221. Corresponding to this, the micro-switch 222 is turned off. In accordance with this rotation of the measuring element, the spring 221 is moved upwardly over the rotation shaft 220 and then the measuring element 219 is erected by means of the spring force of the spring 221. As a result, the measuring element 219 is held in an erected position as shown in FIG. 7(*b*) by operation of a stopper (not shown) and the spring 221. In erected position, the micro-switch 223 is turned on by the switch operating piece 219*b* of the measuring element 219 and then this signal is inputted in an arithmetic control circuit (not shown).

When the arithmetic control circuit receives the on-signal from the micro-switch 223, it operates the drive motor 253 to rotate the gear 258 in counter-clockwise direction, in turn to move the lower slide 252 leftward, thus separating the pushing portion 263*a* of the pushing shaft 263 from the upper slider 252 as shown in FIG. 8(*a*). Corresponding to such operation, the upper slider 212 is moved leftward by means of the spring force of the spring 228 to contact a measuring surface of the measuring element 219 with peripheral edge of the lens-shaped template 112 as shown in FIG. 8(*a*). In this state, the base rotation motor 204 is rotated to move the measuring element 219 along the peripheral edge of the lens-shaped template 112. The movement of the upper slider 212 then is detected with the vector radius measuring means 217 to input the output of the measuring means 217 in an arithmetic control circuit (not shown).

The arithmetic control circuit obtains a vector radius pi of the template 112 based on the output from the measuring means 217 and then the vector radius pi is formed as vector radius information (θi, ρi) corresponding to a rotation angle θi of the base rotation motor 204. This information (θi, ρi) is stored in a memory (not shown).

(iii) (Measurement of the Lens Thickness of an Uncut Lens, Based on template Shape Information When the data requirement switch 81 of the lens edging apparatus 2 is turned on, the control circuit 63 transfers template shape information, i.e., radius vector information (θi, ρi) of a lens-shaped template, such as that of a demonstration lens, which has been obtained by the frame shape measuring apparatus 1 in the same way as described above or transfers shape information (θi, ρi, Zi) of a lens frame to the lens frame shape memory 90 of the lens edging apparatus 2 and allows the memory 90 to store the information On the other hand, the uncut lens L is clamped between the lens rotating shafts 304, 304, and then the switch 85 is turned on. Thereby, the arithmetic/judgment circuit 91 allows a drive means (not shown) to enlarge the distance between the feelers 332, 334, and actuates the pulse motor 336 to cause the feelers 332, 334 to face the front and back refractive surfaces of the uncut lens L, respectively. Thereafter, the drive means (not shown) is stopped from enlarging the distance between the feelers 332, 334, and the feelers 332, 334 are brought into contact with the front and back refractive surfaces of the uncut lens L, respectively. Thereafter, based on the template shape information (θi, ρi, Zi) or the radius vector information (θi, ρi), the arithmetic/judgment circuit 91 actuates the pulse motor 337 so as to rotate the lens rotating shafts 304, 304 and rotate the uncut lens L, and, at the same time, actuates and controls the pulse motor 336. At this time, the arithmetic/judgment circuit 91 calculates a lens thickness Δi in the template shape information (θi, ρi, Zi) or the radius vector information (θi, ρi), based on the output from the encoder 335, and then allows the grinding data memory 95 to store the lens thickness Δi.

(Modified Example of (Measuring Means)

In FIG. 9, although the feelers 332,334 are provided movably and separately and the lens L to be measured is disposed between the feelers to measure a thickness of the lens, the present invention is not limited to this construction.

Figure 15:
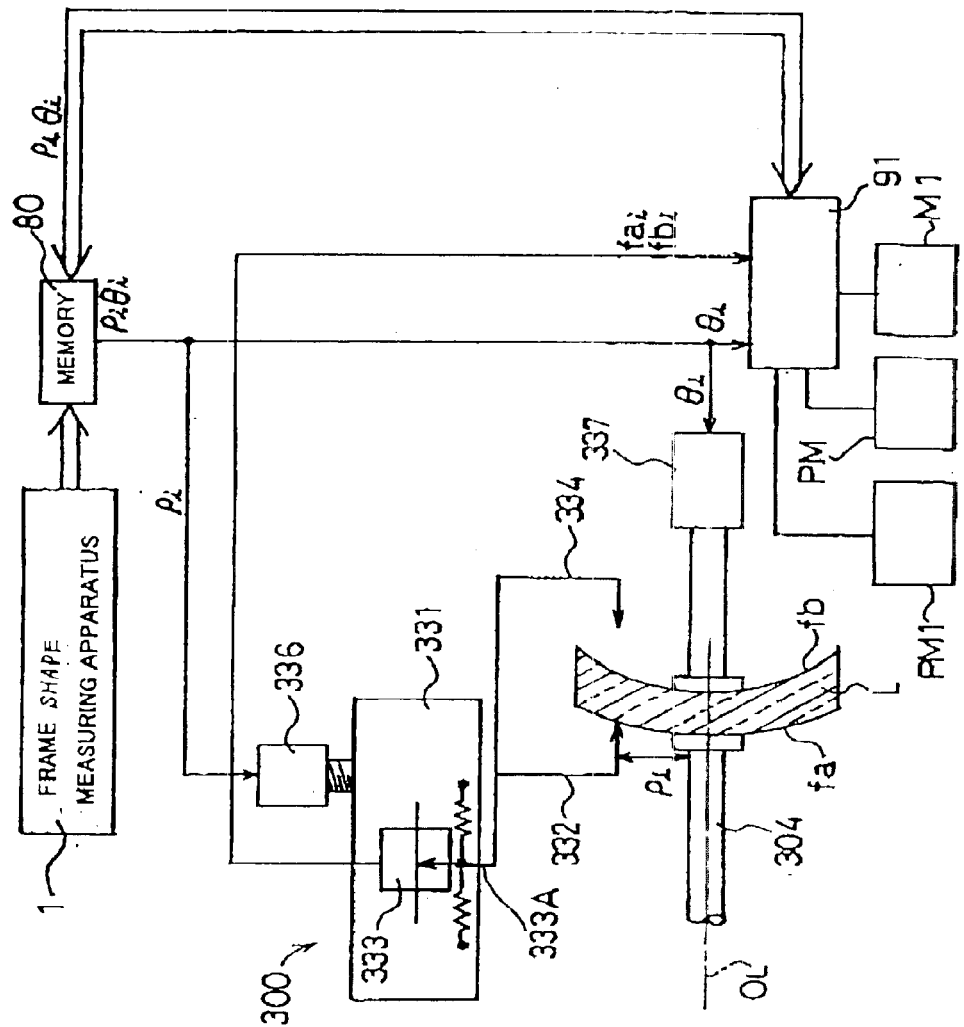
FIG. 15 is an explanatory view showing a relationship between a frame shape measuring apparatus in the other embodiment and a lens grinding machine.

For example, as shown in FIG. 15, two feelers 332 and 334 may be combined integrally with a supporting member 333A to be movable integrally the feelers 332 and 334 along an optical axis OL and the amount of movement of the feelers 332 and 334 may be detected with one encoder 333. In this case, a space fx between the feelers 332 and 334 is set with a very large space (predetermined space) than an expected thickness of the measured lens L.

The supporting member 333A is held on a stage 331 to move in only rightward and leftward directions. Springs S1 and S2 are disposed at right and left sides of the supporting member 333A between the supporting member 333A and stage 331. The springs S1 and S2 hold the supporting member 333A at almost center of the scope of rightward and leftward movement thereof when the feelers 332 and 334 do not contact with the measured lens L (non-measurement). The stage 331 is mounted on a body for holding a carriage (not shown) to move in either direction relative to the lens rotation shafts 304,304 by means of the pulse motor 336 mounted on the body. The carriage and lens rotation shafts 304,304 are moved in rightward and left ward directions (axial directions of the lens rotation shafts 304,304) by a pulse motor PM. In FIG. 15, the arithmetic/judgment circuit 91 drives and controls the pulse motor PM to move rightward and leftward the lens L in measuring thickness of edge of the lens.

The pulse motor PM is stopped when the lens L faces between the feelers 332, 334.

Next, the arithmetic/judgment circuit 91 controls the pulse motor 336 to move the stage 331 in the side of the lens rotation shafts 304,304, thus positioning the measured lens L between the feelers 332, 334. In this case, the lens rotation shafts 304,304 are rotated by the pulse motor 337 so as to position the leading ends of the feelers 332, 334 at an initial position of the vector radium information (θi, ρi), namely, in a rotation angle θ0 of vector radium information (θ0, ρ0). Further, in the rotation θ0, the stage 331 and feelers 332, 334 are moved in the side of the lens rotation shafts 304,304 until the leading ends of the feelers 332, 334 correspond to the vector radius ρ0 of the measured lens L, by controlling the pulse motor 336.

In this state, a pulse motor PM1 which moves rightward and leftward the carriage (not shown) is controlled to move rightward and leftward the carriage, lens rotation shafts 304,304 and the lens L, thus, contacting the feeler 332 with a front refraction surface fa or the feeler 334 with a rear refraction surface fb. This control is performed by means of the arithmetic/judgment circuit 91.

In such a way, the arithmetic/judgment circuit first contacts one feeler 332 with the front refraction surface fa of the measured lens L.

The arithmetic/judgment circuit 91 also rotates the rotation shafts 304,304 to obtain coordinates or position of the front refraction surface fa of the lens L in direction of the optical axis OL in the vector radius information (θi, ρi) based on an output signal (measuring signal) of the encoder 333 and an amount of drive of the pulse motor PM1. In other words, when the arithmetic/judgment circuit 91 rotates the rotation shafts 304,304 to start the measurement of thickness of edge of the lens, it controls the pulse motor 386 based on the vector radius ρi every the rotation angle θi of the rotation shafts 304,304. The arithmetic/judgment circuit then moves together the stage 331 and feeler 332 relative to the optical axis OL in either direction to adjust a distance from the optical axis OL to a contact position of the feeler 332 with the lens L to the vector radius θi, thus obtaining as fai, coordinates or position of the front refraction surface fa of lens L in direction of the optical axis OL in the vector radius information (θi, ρi) based on an output signal (measuring signal) of the encoder 333 and an amount of drive of the pulse motor PM1.

Next, the arithmetic/judgment circuit 91 contacts the other feeler 334 with the rear refraction surface fb of the lens L as described above.

The arithmetic/judgment circuit 91 then rotates the rotation shafts 304,304 to obtain coordinates or position of the rear refraction surface fb of the lens L in direction of the optical axis OL in the vector radius information (θi, ρi) based on an output signal (measuring signal) of the encoder 333 and a driven amount of the pulse motor PM1. In other words, when the arithmetic/judgment circuit 91 rotates the rotation shafts 304,304 to start measurement of thickness of edge of the lens, it controls the pulse motor 336 based on the vector radius ρi every the rotation angle θi of the rotation shafts 304,304. The arithmetic/judgment circuit then moves together the stage 31 and feeler 332 relative to the optical axis OL in either direction to adjust a distance from the optical axis OL to a contact position of the feeler 332 with the lens L to the vector radius ρi, thus obtaining as fbi, coordinates or position of the rear refraction surface fb of the lens L in direction of the optical axis OL in the vector radius information (θi, ρi) based on an output signal (measuring signal) of the encoder 333 and an amount of drive of the pulse motor PM1.

Thereafter, the arithmetic/judgment circuit 91 obtains a space between the front and rear refraction surfaces fa and fb of the lens L in the vector radius information (θi, ρi) as the thickness of edge, Wi=|fai−fbi|. According to this construction, since thickness of edge of the lens is measured by only one encoder 333, it is possible to minimize the stage 331, to easily assemble the stage in the apparatus and to eliminate all the cost of the apparatus because a high cost encoder can be omitted.

<Embodiment 2>

In the aforementioned embodiment, although the, measuring force by the measuring element 216 is set to electrically control by use of the drive motor 401 and micro-switches 404, 405, the present invention is not limited to this.

Figure 16:
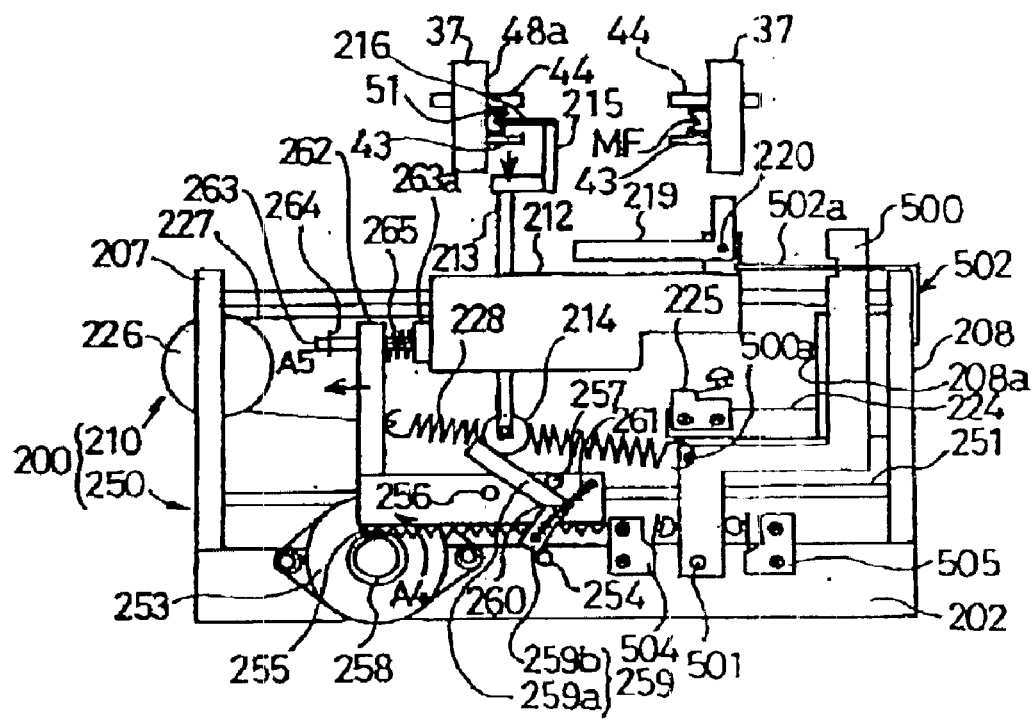
FIG. 16 is an explanatory view showing a main portion in the other embodiment of a frame shape measuring apparatus according to the present invention.

For example, as shown in FIG. 16, the measuring force by the measuring element 216 may be switched with manual.

In FIG. 16, a crank-shaped switching lever 500 for switching measuring pressure is provided. The lever acts to change the measuring force with manual. The lever has a lower end positioned at the side of the supporting plate 208. The lever is held rotatably on the rotation base 202 by means of a support shaft 501.

Figure 17:
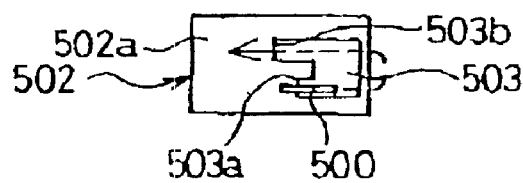
FIG. 17 is an explanation view of plates for changing a measuring pressure as shown in FIG. 16.

Accordingly, an upper end of the lever 500 is rotatable relative to the supporting plates 207, 208. At an intermediate portion of the lever 500 is projected a spring engagement pin 500a with which a spring 228 is engaged. As a result, the lever 500 is energized always in leftward direction as viewed in FIG. 18. A plate 502 for engaging L-shaped lever 500 is fixed to the upper end of the supporting plate 208. This plate 502 has a plate portion 502a extending horizontally in the side of the supporting plate 207. The plate portion 502a is formed with a lever inserting hole 503 as shown in FIG. 17, in which an upper portion of the lever 500 is inserted. The lever-inserting hole 503 is formed with two lever engaging portions 503a, 523b which are spaced in a direction of separating from the supporting plate 208.

Further, micro-switches 504, 505 for detecting that the switching lever 500 is engaged with the lever engaging portions 503a, 503b are provided. A lever for detecting signal from the micro-switches 504, 505 is input in the arithmetic control circuit 270.

A liquid crystal display (not shown) or speaker (not shown) is also provided in the body 10. If the width of rim is less than a predetermined value and the lens frames are easy to deform, the arithmetic control circuit 270 informs to an operator of this information with the liquid crystal display or speaker and gives instructions that the measuring force should be changed largely to the operator. An operation of the aforementioned construction will be explained below.

When the lever 500 is engaged with the lever engaging portion 503a, a force for pulling the spring 228 is large and therefore the measuring force by the measuring element 216 becomes large. If the lever 500 is engaged with the lever engaging portion 503b, the force for pulling the spring 228 is small and therefore the measuring force by the measuring element 216 becomes small.

Furthermore, if the width of rim of the measured lens frames is large than a predetermined value and in case of normal lens frames which are difficult to deform even by a large measuring forces the arithmetic control circuit informs to the operator of this information with the liquid crystal display or speaker and gives instructions that the measuring force should be changed largely to the operation.

In accordance with the instructions, the operator engages the lever 500 with the lever engaging portion 503a and then moves the lever 500 vertically to set a large measuring force by the measuring element 216. In this case, if there is no detecting signal from the micro-switch 505, the arithmetic control circuit 207 gives instructions that the measuring force should be again changed to the operator. After detecting signal is emitted from the micro-switch 505, the arithmetic control circuit 270 starts measurement of the lens frames if the start switch 13 is turned on.

Furthermore, if the width of rim of the measured lens frames is less than a predetermined value and in case of lens frames which tend to deform by a large measuring force, the arithmetic control circuit 270 informs to the operator of this information with the liquid crystal display or speaker and gives instructions that the measuring force should be changed largely to the operation.

Figure 18:
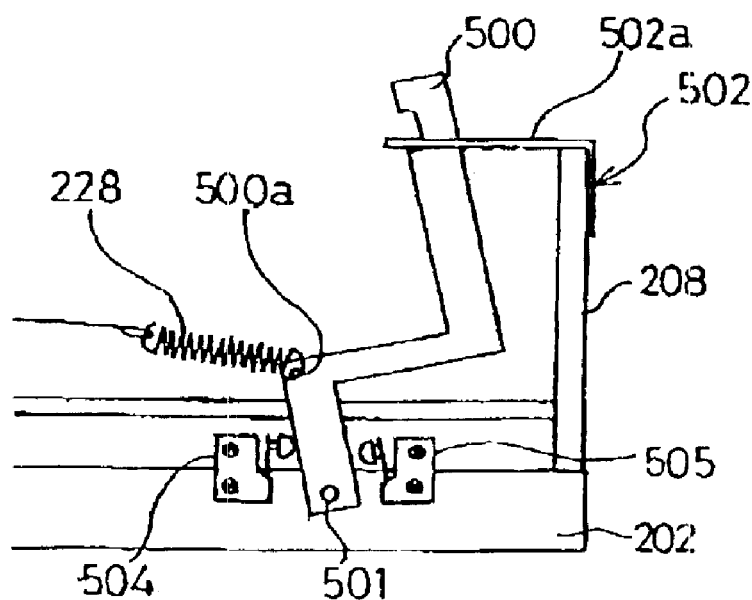
FIG. 18 is an explanatory view showing an operation of the plates as shown in FIG. 16.

In accordance with the instructions, the operator engages the lever 500 with the lever engaging portion 503a and then inclines the lever 500 in a direction spaced apart from the supporting plate 208 to set a less measuring force by the measuring element 216, as shown in FIG. 18. In this case, if there is no detecting signal from the micro-switch 505, the arithmetic control circuit 207 gives instructions that the measuring force should be again changed to the operator. After detecting signal is emitted from the micro-switch 505, the arithmetic control circuit 270 starts measurement of the lens frames if the start switch 13 is turned on.

Also, when the arithmetic control circuit 270 judges that the space between upper and lower rims of the measured lens frames is less than a predetermined value and the measured lens frame are the elongate lens frames, the arithmetic control circuit informs to the operator of this information with the liquid crystal display or speaker and gives instructions that the measuring force should be changed largely to the operation.

In accordance with the instructions, the operator engages the lever 500 with the lever engaging portion 503a and then inclines the lever 500 in a direction spaced apart from the supporting plate 208 to set a less measuring force by the measuring element 216, as shown in FIG. 18. In this case, if there is no detecting signal from the micro-switch 505, the arithmetic control circuit 207 gives instructions that the measuring force should be again changed to the operator. After detecting signal is emitted from the micro-switch 505, the arithmetic control circuit 270 starts measurement of the lens frames if the start switch 13 is turned on.

According to the present invention, since the rotational speed or rotational direction of the measuring element can be varied by the control means or arithmetic control circuit, it is possible to perform precise measurement in accordance with a shape of lens frames, for example, even though lens frames which are easy to deform by an external force such as elongate (crab's eye-shaped) lens frames.

What is claimed is:

1. An apparatus for measuring a shape of lens frames of eyeglasses comprising:
   a measuring element for contacting with grooves of said lens frames; and
   means for controlling said measuring element, wherein said means for controlling identifies a lens frame to be measured as a lens frame for elongate lens glasses, and
   said means for controlling controls a rotational speed of said measuring element to be slower than a normal rotational speed of said measuring element when said lens frame to be measured is identified as a lens frame for elongate lens glasses.

2. An apparatus for measuring a shape of lens frames of eyeglasses according to claim 1, wherein said apparatus further comprises means for varying a contacting force of the measuring element with the lens frames.

3. An apparatus for measuring a shape of lens frames of eyeglasses according to claim 1, wherein said apparatus further comprises means for setting a measured part of the measuring element.

4. An apparatus for measuring a shape of lens frames of eyeglasses according to claim 1, wherein said means for controlling further comprises means for varying a rotational direction of said measuring element.

5. An apparatus for measuring a shape of lens frames of eyeglasses according to claim 1, wherein said means for controlling controls said rotational speed of said measuring element to rotate it while contacting said measuring element with said grooves of said lens frames at an indicated interval of time.

6. An apparatus for measuring a shape of lens frames of eyeglasses according to claim 1, wherein said means for controlling controls said rotational speed of said measuring element to rotate it while contacting said measuring element with said grooves of said lens frames at a manually-set interval of time.

7. An apparatus for measuring a shape of lens frames of eyeglasses comprising:
   a measuring element for contacting with grooves of said lens frames; and
   means for controlling said measuring element, wherein said means for controlling identifies a lens frame to be measured as a lens frame for elongate lens glasses, and
   said means for controlling slows a rotational speed of said measuring element in a nose pad side and an ear hooking portion side of the lens frame for the elongate lens glasses, and controls the rotational speed of said measuring element to be a normal rotational speed in the other portions of the lens frame for the elongate lens glasses, when said lens frame to be measured is identified as a lens frame for elongate lens glasses.

8. An apparatus for measuring a shape of lens frames of eyeglasses according to claim 7, wherein said means for controlling further comprises means for varying a rotational direction of said measuring element.

9. An apparatus for measuring a shape of lens frames of eyeglasses according to claim 7, wherein said means for controlling controls said rotational speed of said measuring element to rotate it while contacting said measuring element with said grooves of said lens frames at an indicated interval of time.

10. An apparatus for measuring a shape of lens frames of eyeglasses according to claim 7, wherein said means for controlling controls said rotational speed of said measuring element to rotate it while contacting said measuring element with said grooves of said lens frames at a manually-set interval of time.

11. An apparatus for measuring a shape of lens frames of eyeglasses according to claim 7, wherein said apparatus further comprises means for setting a measured part of the measuring element.

12. An apparatus for measuring a shape of lens frames of eyeglasses according to claim 7, wherein said apparatus further comprises means for varying a contacting force of the measuring element with the lens frames.

13. An apparatus for measuring a shape of lens frames of eyeglasses comprising:
   a measuring element for contacting with grooves of said lens frames; and
   means for controlling said measuring element, wherein said means for controlling comprises means for varying a rotational speed of said measuring element, and
   said means for controlling further comprises means for informing an operator of said apparatus of a determination made by means for judging whether said lens frames are to be measured.

14. An apparatus for measuring a shape of lens frames of eyeglasses comprising:

a measuring element for contacting with grooves of said lens frames; and means for controlling said measuring element, wherein said means for controlling comprises means for varying a rotational direction of said measuring element, and said means for controlling further comprises means for informing an operator of said apparatus of a determination made by said means for judging whether said lens frames are to be measured.

15. An apparatus for measuring a shape of lens frames of eyeglasses comprising:

a measuring element for contacting with grooves of said lens frames; and means for controlling said measuring element, wherein said means for controlling comprises means for varying a rotational speed and a rotational direction of said measuring element, and said means for controlling further comprises means for informing an operator of said apparatus of a determination made by means for judging whether said lens frames are to be measured.

16. An apparatus for measuring a shape of lens frames of eyeglasses comprising:

a measuring element for contacting with grooves of said lens frames; and means for controlling said measuring element, wherein said means for controlling comprises means for varying a rotational speed of said measuring element, and said apparatus further comprises means for measuring a time of contact between said measuring element and said lens frames.

17. An apparatus for measuring a shape of lens frames of eyeglasses comprising:

a measuring element for contacting with grooves of said lens frames; and means for controlling said measuring element, wherein said means for controlling comprises means for varying a rotational direction of said measuring element, and said apparatus further comprises means for measuring a time of contact between said measuring element and said lens frames.

18. An apparatus for measuring a shape of lens frames of eyeglasses comprising:

a measuring element for contacting with grooves of said lens frames; and means for controlling said measuring element, wherein said means for controlling comprises means for varying a rotational speed and a rotational direction of said measuring element, and said apparatus further comprises means for measuring a time of contact between said measuring element and said lens frames.

* * * * *